(12) United States Patent
Su et al.

(10) Patent No.: US 10,760,921 B2
(45) Date of Patent: Sep. 1, 2020

(54) START-OF-ROUTE MAP NAVIGATION WITH SUPPRESSION OF OFF-ROUTE FEEDBACK

(71) Applicant: Microsoft Technology Licensing, LLC, Redmond, WA (US)

(72) Inventors: Chien-Wen Danny Su, Ontario (CA); Mudassir Alam, Redmond, WA (US); Aarti Bharathan, Sunnyvale, CA (US); Juan Pablo Candelas Gonzalez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 15/821,457

(22) Filed: Nov. 22, 2017

(65) Prior Publication Data

US 2018/0094944 A1 Apr. 5, 2018

Related U.S. Application Data

(63) Continuation of application No. 14/983,054, filed on Dec. 29, 2015, now Pat. No. 9,835,469, which is a
(Continued)

(51) Int. Cl.
*G01C 21/36* (2006.01)
*G01C 21/34* (2006.01)

(52) U.S. Cl.
CPC ..... *G01C 21/3626* (2013.01); *G01C 21/3415* (2013.01); *G01C 21/3667* (2013.01)

(58) Field of Classification Search
CPC ................ G01C 21/3415; G01C 21/00; G01C 21/34–3423; G01C 21/3438;
(Continued)

(56) References Cited

U.S. PATENT DOCUMENTS

| 5,243,528 A | 9/1993 | Lefebvre |
| 5,450,343 A | 9/1995 | Yurimoto et al. |

(Continued)

OTHER PUBLICATIONS

Li et al., "Research on Route Planning and Map-Matching in Vehicle GPS/Dead Reconing/Electronic Map Integrated Navigation System," Proceedings: Intelligent Transportation Systems 2003, pp. 1639-1643, Published Date: Oct. 12-15, 2003.
(Continued)

*Primary Examiner* — Bao Long T Nguyen
(74) *Attorney, Agent, or Firm* — Ray Quinney & Nebeker P.C.; Paul N. Taylor

(57) ABSTRACT

A map navigation tool provides a start-of-route buffer area in which off-route feedback (e.g., audio or visual warnings or alerts) can be suppressed in some circumstances. For example, a mobile computing device implements a map navigation tool that can output off-route feedback when the user strays from a route, but also can suppress off-route feedback when the user is within a start-of-route buffer area. Off-route feedback can continue to be suppressed until some other event, such as the user leaving the start-of-route buffer area, occurs. Off-route feedback can be suppressed even if the user is not within a start-of-route buffer area, such as when the map navigation tool generates a route when the user is at an initial location that is far away from any part of the route and then joins the route later (e.g., at the start location or downstream from the start location).

24 Claims, 18 Drawing Sheets

Related U.S. Application Data continuation of application No. 13/269,342, filed on Oct. 7, 2011, now Pat. No. 9,261,373.

(60) Provisional application No. 61/489,223, filed on May 23, 2011, provisional application No. 61/489,227, filed on May 23, 2011.

(58) Field of Classification Search
CPC ....... G01C 21/36–3605; G01C 21/3611–3614; G01C 21/3626; G01C 21/3664; G01C 21/3667–367; G01C 21/3676
USPC ........ 701/408–411, 413, 416–418, 426, 428, 701/431–432, 442, 445, 454–458, 460, 701/466, 516, 518–519, 527, 532–533, 701/538; 340/995.1, 995.14–995.17, 340/995.19, 995.21, 995.23, 340/995.25–995.27; 455/456.1, 456.3, 455/457
See application file for complete search history.

(56) References Cited

U.S. PATENT DOCUMENTS

| | | | |
|---|---|---|---|
| 5,652,706 A * | 7/1997 | Morimoto | G01C 21/3415 340/460 |
| 5,757,289 A | 5/1998 | Nimura et al. | |
| 5,787,383 A | 7/1998 | Moroto et al. | |
| 5,902,349 A | 5/1999 | Endo et al. | |
| 6,064,941 A | 5/2000 | Nimura et al. | |
| 6,101,443 A | 8/2000 | Kato et al. | |
| 6,104,315 A * | 8/2000 | Volkel | G01C 21/3415 340/988 |
| 6,144,318 A | 11/2000 | Hayashi et al. | |
| 6,487,496 B2 | 11/2002 | Katayama et al. | |
| 6,681,179 B1 | 1/2004 | Chen | |
| 6,708,110 B2 | 3/2004 | Stefan | |
| 6,909,398 B2 | 6/2005 | Knockeart et al. | |
| 6,950,746 B2 | 9/2005 | Yano et al. | |
| 6,978,209 B2 | 12/2005 | Nakahara | |
| 7,239,958 B2 | 7/2007 | Grougan | |
| 7,603,230 B2 | 10/2009 | Suzuki et al. | |
| 7,653,484 B2 | 1/2010 | Choi | |
| 7,920,967 B1 | 4/2011 | Harris et al. | |
| 8,615,359 B2 | 12/2013 | Alam et al. | |
| 2002/0165667 A1 | 11/2002 | Lee | |
| 2005/0033511 A1 * | 2/2005 | Pechatnikov | G01C 21/32 701/411 |
| 2006/0089797 A1 | 4/2006 | Suzuki | |
| 2006/0116816 A1 | 6/2006 | Chao | |
| 2006/0142940 A1 | 6/2006 | Choi | |
| 2007/0282523 A1 | 12/2007 | Diekhans et al. | |
| 2008/0021643 A1 | 1/2008 | Nishiyama | |
| 2008/0027640 A1 | 1/2008 | Kashalkar | |
| 2008/0103693 A1 | 5/2008 | Kato | |
| 2009/0024320 A1 | 1/2009 | Nakamura | |
| 2009/0157292 A1 | 6/2009 | Currie et al. | |
| 2009/0222587 A1 | 9/2009 | Ahn | |
| 2010/0076674 A1 | 3/2010 | Berot | |
| 2010/0123737 A1 | 5/2010 | Williamson et al. | |
| 2010/0148981 A1 | 6/2010 | Isaacson et al. | |
| 2010/0153007 A1 | 6/2010 | Crowley | |
| 2010/0306696 A1 | 12/2010 | Groth et al. | |
| 2011/0010091 A1 | 1/2011 | Currie et al. | |
| 2011/0035148 A1 | 2/2011 | Machino | |
| 2011/0054775 A1 | 3/2011 | Snyder | |
| 2011/0054791 A1 | 3/2011 | Surampudi | |
| 2011/0143809 A1 | 6/2011 | Salomone et al. | |
| 2011/0153208 A1 | 6/2011 | Kruglick | |
| 2011/0196601 A1 | 8/2011 | Miura et al. | |
| 2012/0179367 A1 | 7/2012 | Niu | |

OTHER PUBLICATIONS

Non Final Office Action Issued in U.S. Appl. No. 13/269,342, dated Nov. 9, 2012, 7 Pages.

Non Final Office Action Issued in U.S. Appl. No. 13/269,342, dated May 27, 2015, 23 Pages.

Notice of Allowance Issued in U.S. Appl. No. 13/269,461, dated Sep. 18, 2013, 18 pages.

Notice of Allowance Issued in U.S. Appl. No. 13/269,342, dated Oct. 7, 2015, 5 Pages.

Office action in related application U.S. Appl. No. 13/269,461, dated Feb. 6, 2013, 22 pp.

Office action in related application U.S. Appl. No. 13/269,342, dated May 13, 2013, 8 pp.

Office action in related application U.S. Appl. No. 13/269,342, dated Oct. 10, 2013, 9 pp.

* cited by examiner

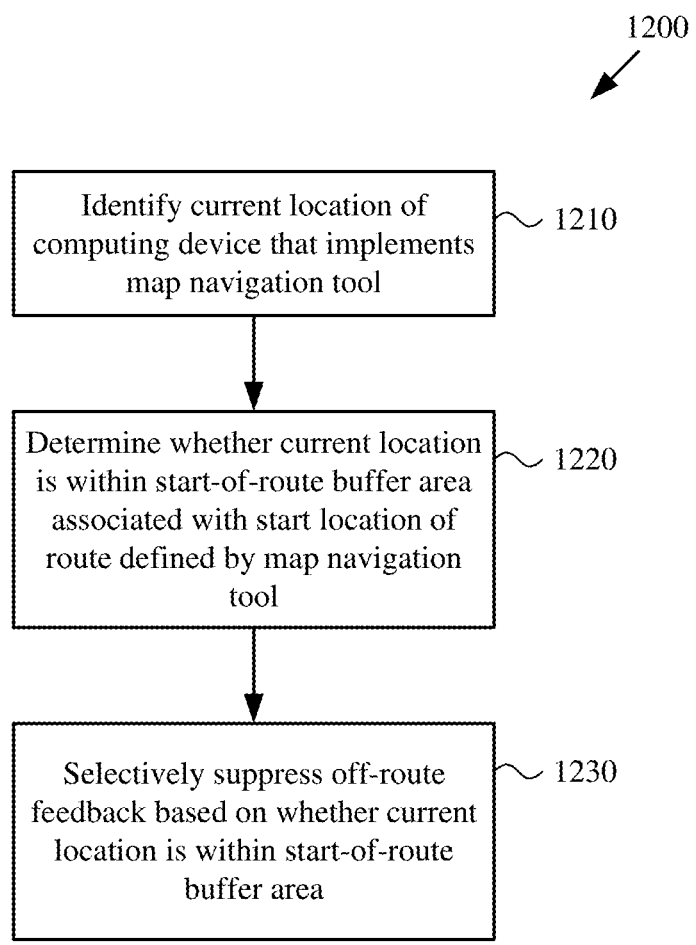

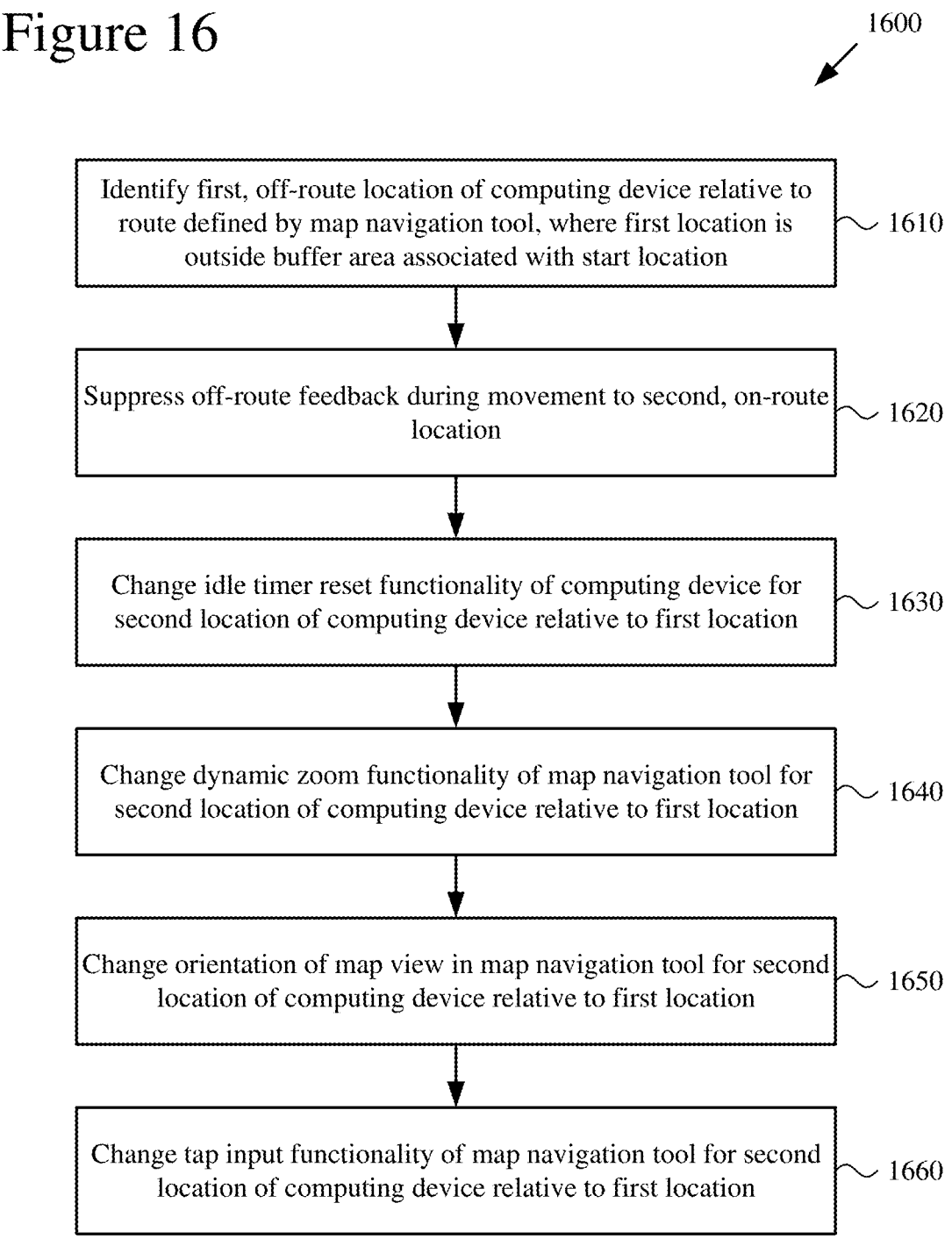

START-OF-ROUTE MAP NAVIGATION WITH SUPPRESSION OF OFF-ROUTE FEEDBACK

CROSS-REFERENCE TO RELATED APPLICATIONS

This is a continuation of U.S. patent application Ser. No. 14/983,054, filed Dec. 29, 2015 and titled "START-OF-ROUTE MAP NAVIGATION WITH SUPPRESSION OF OFF-ROUTE FEEDBACK," which is a continuation of U.S. patent application Ser. No. 13/269,342, filed Oct. 7, 2011, U.S. Pat. No. 9,261,373, issued Feb. 16, 2016, and titled "START-OF-ROUTE MAP NAVIGATION WITH SUPPRESSION OF OFF-ROUTE FEEDBACK," which claims the benefit of U.S. Provisional Patent Application No. 61/489,223, entitled "MAP NAVIGATION NEAR ROUTE TERMINUS," filed on May 23, 2011, and U.S. Provisional Patent Application No. 61/489,227, entitled "MAP NAVIGATION WITH START-OF-ROUTE BUFFER AREA," filed on May 23, 2011, all of which are incorporated herein by reference.

BACKGROUND

Computer-aided map navigation tools have achieved widespread acceptance. A user can find an address or directions with map navigation tools available at various Web sites. Some software programs allow a user to navigate over a map, zooming in towards the ground or zooming out away from the ground, or moving between different geographical positions. In cars, GPS devices have provided rudimentary road navigation for years. More recently, map navigation software for cellular telephones and other mobile computing devices has allowed users to zoom in, zoom out, and move around a map that shows details about geographical features, town, city, county and state locations, roads, and buildings.

With a turn-by-turn navigation system, a list of directions for a route is organized as multiple items corresponding to steps or instructions along the route. The multiple items are typically presented in order to a user as the user travels along the route. Usually, the current location of the user is shown, and the user can be alerted of an upcoming turn or other instruction. While such systems work well in some scenarios, in other scenarios the presentation of directions can be overly complicated.

SUMMARY

Techniques and tools are described for map navigation with suppression of off-route feedback. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any specific advantage be present or problem be solved.

In described examples, to simplify navigation near a start location of a route, a map navigation tool provides a start-of-route buffer area in which off-route feedback (e.g., audio or visual warnings or alerts) can be suppressed in some circumstances. For example, a mobile computing device (e.g., a smart phone) implements a map navigation tool that can output off-route feedback when the user strays from a route defined by the tool (e.g., by taking a wrong turn), but also can suppress the off-route feedback when the user is within a start-of-route buffer area associated with the route. This can help to avoid unnecessary, misleading, or annoying off-route feedback in many navigation scenarios, such as where a user must make several turns to leave a parking area before continuing along a route. The off-route feedback can continue to be suppressed for a length of time (e.g., until some other event, such as the user leaving the start-of-route buffer area, occurs). As another example, off-route feedback can be suppressed even if the user is not within a start-of-route buffer area, such as when the map navigation tool generates (e.g., in response to user input) a route when the user is at an initial location that is far away from any part of the route, and the user then joins the route later (e.g., at the start location or downstream from the start location).

The foregoing and other objects, features, and advantages of the invention will become more apparent from the following detailed description, which proceeds with reference to the accompanying figures.

BRIEF DESCRIPTION OF THE DRAWINGS

FIGS. 12 and 13 are flowcharts showing techniques for performing map navigation using a start-of-route buffer area.

FIG. 16 is a flowchart showing a detailed technique for performing map navigation in which off-route feedback is suppressed during movement from an off-route location to an on-route location.

DETAILED DESCRIPTION

Techniques and tools are described for map navigation along a route defined by a map navigation tool. A map navigation tool can use off-route feedback to alert a user when the user has moved off-route. For example, a map navigation tool can use audio alerts (e.g., a warning tone or a verbal warning such as "turn around," "off-route," or "recalculating") or visual alerts for off-route feedback. In described examples, to simplify navigation near a terminus of a route (e.g., near an end location or a start location), a terminus buffer area (e.g., an end-of-route buffer area or a start-of-route buffer area) is provided in a map navigation tool to allow suppression of off-route feedback (e.g., audio or visual warnings or alerts) in some circumstances, such as when a mobile computing device that implements the map navigation tool enters the terminus buffer area. The off-route feedback can continue to be suppressed for a length of time (e.g., until some other event, such as a user leaving the terminus buffer area, occurs). A map navigation tool can disable off-route warnings when a user crosses an arrival threshold and enters an arrival area. The arrival area can be within an end-of-route buffer area. Off-route feedback can be suppressed for a user even if the user is not within a start-of-route buffer area, such as when the user generates a route at an initial location that is far away from any part of the route and then joins the route later (e.g., at the start location or at some other point on the route downstream from the start location).

The techniques and tools described herein can be used individually or in combination with each other or other techniques and tools.

Example Mobile Computing Device

Figure 1:
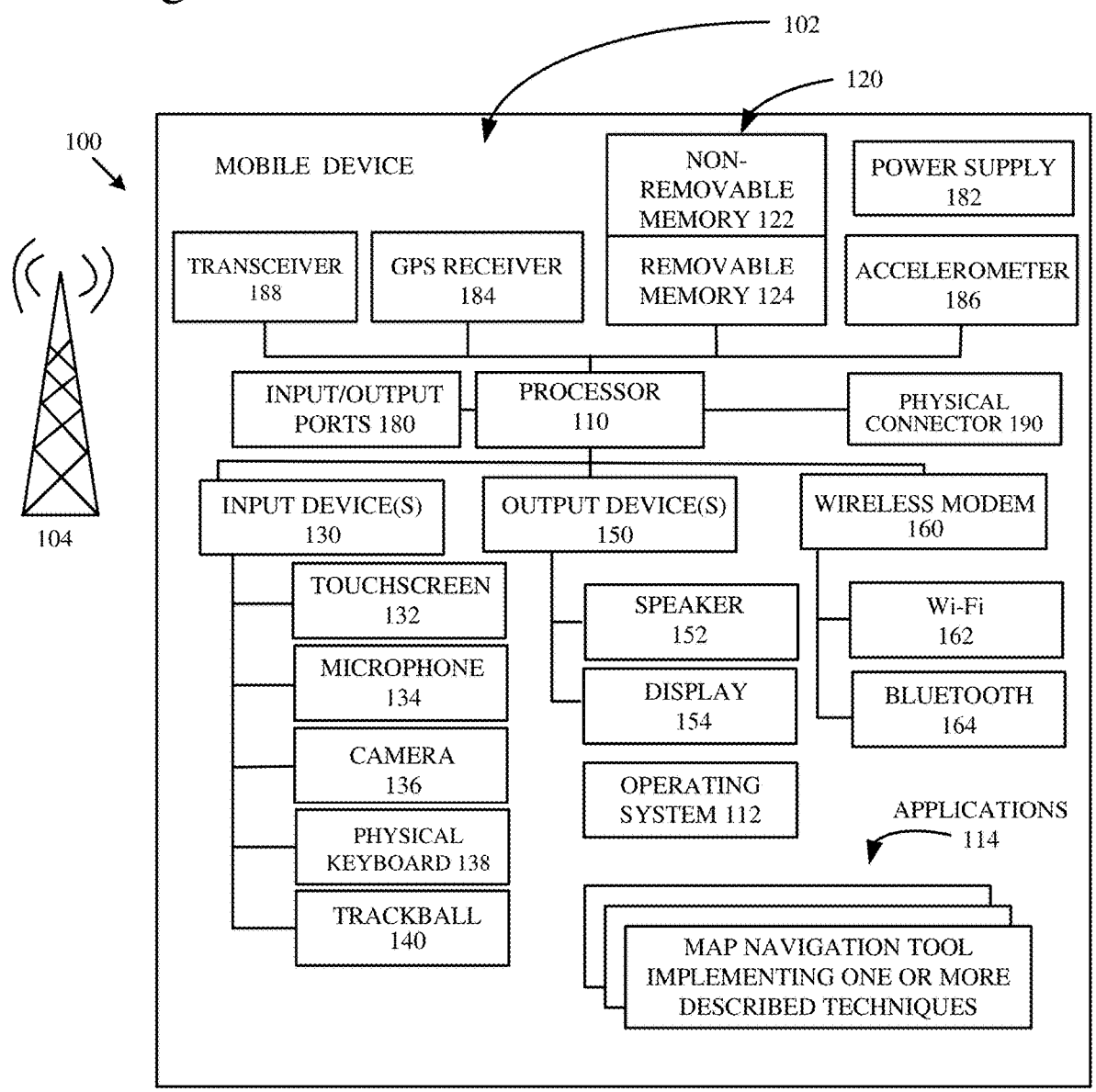
FIG. 1 is a block diagram illustrating an example mobile computing device in conjunction with which techniques and tools described herein may be implemented.

FIG. 1 depicts a detailed example of a mobile computing device (100) capable of implementing the techniques and solutions described herein. The mobile device (100) includes a variety of optional hardware and software components, shown generally at (102). In general, a component (102) in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks (104), such as a Wi-Fi, cellular, or satellite network.

The illustrated mobile device (100) includes a controller or processor (110) (e.g., signal processor, microprocessor, ASIC, or other control and processing logic circuitry) for performing such tasks as signal coding, data processing, input/output processing, power control, and/or other functions. An operating system (112) controls the allocation and usage of the components (102) and support for one or more application programs (114) such as a map navigation tool that implements one or more of the innovative features described herein. In addition to map navigation software, the application programs can include common mobile computing applications (e.g., telephony applications, email applications, calendars, contact managers, web browsers, messaging applications), or any other computing application.

The illustrated mobile device (100) includes memory (120). Memory (120) can include non-removable memory (122) and/or removable memory (124). The non-removable memory (122) can include RAM, ROM, flash memory, a hard disk, or other well-known memory storage technologies. The removable memory (124) can include flash memory or a Subscriber Identity Module (SIM) card, which is well known in Global System for Mobile Communications (GSM) communication systems, or other well-known memory storage technologies, such as "smart cards." The memory (120) can be used for storing data and/or code for running the operating system (112) and the applications (114). Example data can include web pages, text, images, sound files, video data, or other data sets to be sent to and/or received from one or more network servers or other devices via one or more wired or wireless networks. The memory (120) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (100) can support one or more input devices (130), such as a touchscreen (132) (e.g., capable of capturing finger tap inputs, finger gesture inputs, or keystroke inputs for a virtual keyboard or keypad), microphone (134) (e.g., capable of capturing voice input), camera (136) (e.g., capable of capturing still pictures and/or video images), physical keyboard (138), buttons and/or trackball (140) and one or more output devices (150), such as a speaker (152) and a display (154). Other possible output devices (not shown) can include piezoelectric or other haptic output devices. Some devices can serve more than one input/output function. For example, touchscreen (132) and display (154) can be combined in a single input/output device.

The mobile device (100) can provide one or more natural user interfaces (NUIs). For example, the operating system (112) or applications (114) can comprise speech-recognition software as part of a voice user interface that allows a user to operate the device (100) via voice commands. For example, a user's voice commands can be used to provide input to a map navigation tool.

A wireless modem (160) can be coupled to one or more antennas (not shown) and can support two-way communications between the processor (110) and external devices, as is well understood in the art. The modem (160) is shown generically and can include, for example, a cellular modem for communicating at long range with the mobile communication network (104), a Bluetooth-compatible modem (164), or a Wi-Fi-compatible modem (162) for communicating at short range with an external Bluetooth-equipped device or a local wireless data network or router. The wireless modem (160) is typically configured for communication with one or more cellular networks, such as a GSM network for data and voice communications within a single cellular network, between cellular networks, or between the mobile device and a public switched telephone network (PSTN).

The mobile device can further include at least one input/output port (180), a power supply (182), a satellite navigation system receiver (184), such as a Global Positioning System (GPS) receiver, sensors (186) such as an accelerometer, a gyroscope, or an infrared proximity sensor for detecting the orientation and motion of device (100), and for receiving gesture commands as input, a transceiver (188) (for wirelessly transmitting analog or digital signals) and/or a physical connector (190), which can be a USB port, IEEE 1394 (FireWire) port, and/or RS-232 port. The illustrated components (102) are not required or all-inclusive, as any of the components shown can be deleted and other components can be added.

The mobile device can determine location data that indicates the location of the mobile device based upon information received through the satellite navigation system receiver (184) (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to map navigation tool for use in map navigation. For example, the map navigation tool periodically requests, or polls for, current location data through an interface exposed by the operating system (112) (which in turn may get updated location data from another component of the mobile device), or the operating system (112) pushes updated location data through a callback mechanism to any application (such as the map navigation tool) that has registered for such updates. A user of the mobile device can be given notice of the collection of location data (e.g., via an alert provided by the map navigation tool) and the opportunity to provide or deny consent to collection of location data. Consent can be given in the form of opt-out consent, in which the user can take an affirmative action to prevent collection of location data before it is collected, or opt-in consent, in which the user can take an affirmative action to give consent to collection of location data before the data is collected.

With the map navigation tool and/or other software or hardware components, the mobile device (100) implements the technologies described herein. For example, the processor (110) can update a map view and/or list view in reaction to user input and/or changes to the current location of the mobile device. As a client computing device, the mobile device (100) can send requests to a server computing device, and receive map images, distances, directions, other map data, search results or other data in return from the server computing device.

The mobile device (100) can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 1 illustrates a mobile device (100), more generally, the techniques and solutions described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the map navigation techniques and solutions described herein can be implemented with any of the connected devices as a client computing device. Similarly, any of various computing devices in the cloud or a service provider can perform the role of server computing device and deliver map data or other data to the connected devices.

Example Software Architecture for Rendering of Map Data and Directions

Figure 2:
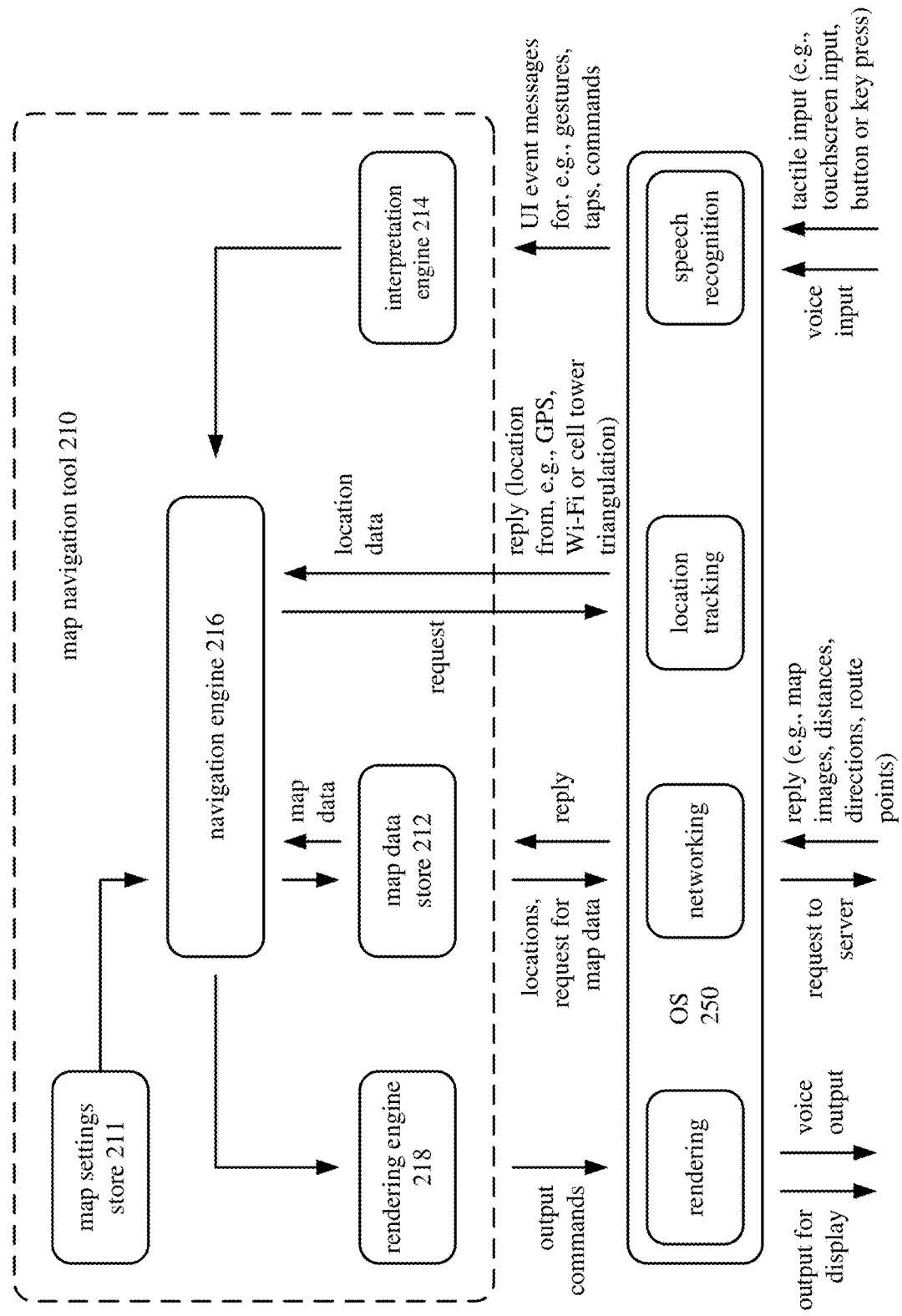
FIG. 2 is a block diagram illustrating an example software architecture for a map navigation tool that renders map views and list views.

FIG. 2 shows an example software architecture (200) for a map navigation tool (210) that renders views of a map depending on user input and location data. A client computing device (e.g., smart phone or other mobile computing device) can execute software organized according to the architecture (200) to render map views, list views of directions for a route, or other views.

The architecture (200) includes a device operating system (OS) (250) and map navigation tool (210). In FIG. 2, the device OS (250) includes components for rendering (e.g., rendering visual output to a display, generating voice output for a speaker), components for networking, components for location tracking, and components for speech recognition. The device OS (250) manages user input functions, output functions, storage access functions, network communication functions, and other functions for the device. The device OS (250) provides access to such functions to the map navigation tool (210).

A user can generate user input that affects map navigation. The user input can be tactile input such as touchscreen input, button presses or key presses or voice input. The device OS (250) includes functionality for recognizing taps, finger gestures, etc. to a touchscreen from tactile input, recognizing commands from voice input, button input or key press input, and creating messages that can be used by map navigation tool (210) or other software. The interpretation engine (214) of the map navigation tool (210) listens for user input event messages from the device OS (250). The UI event messages can indicate a panning gesture, flicking gesture, dragging gesture, or other gesture on a touchscreen of the device, a tap on the touchscreen, keystroke input, or other UI event (e.g., from voice input, directional buttons, trackball input). If appropriate, the interpretation engine (214) can translate the UI event messages from the OS (250) into map navigation messages sent to a navigation engine (216) of the map navigation tool (210).

The navigation engine (216) considers a current view position (possibly provided as a saved or last view position from the map settings store (211)), any messages from the interpretation engine (214) that indicate a desired change in view position, map data and location data. From this information, the navigation engine (216) determines a view position and provides the view position as well as location data and map data in the vicinity of the view position to the rendering engine (218). The location data can indicate a current location (of the computing device with the map navigation tool (210)) that aligns with the view position, or the view position can be offset from the current location.

The navigation engine (216) gets current location data for the computing device from the operating system (250), which gets the current location data from a local component of the computing device. For example, the location data can be determined based upon data from a global positioning system (GPS), by triangulation between towers of a cellular network, by reference to physical locations of Wi-Fi routers in the vicinity, or by another mechanism.

The navigation engine (216) gets map data for a map from a map data store (212). In general, the map data can be photographic image data or graphical data (for boundaries, roads, etc.) at various levels of detail, ranging from high-level depiction of states and cites, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Aside from names, the map data can include distances between features, route points (in terms of latitude and longitude) that define a route between start and end locations, text directions for decisions at waypoints along the route (e.g., turn at NE 148$^{th}$), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging). Links can be provided for Web pages, to launch a Web browser and navigate to information about the feature.

The organization of the map data depends on implementation. For example, in some implementations, different types of map data (photographic image data or graphical surface layer data, text labels, icons, etc.) are combined into a single layer of map data at a given level of detail. Up to a certain point, if the user zooms in (or zooms out), a tile of the map data at the given level of detail is simply stretched (or shrunk). If the user further zooms in (or zooms out), the tile of map data at the given level of detail is replaced with one or more other tiles at a higher (or lower) level of detail. In other implementations, different types of map data are organized in different overlays that are composited during rendering, but zooming in and out are generally handled in the same way, with overlapping layers stretched (or shrunk) to some degree, and then replaced with tiles at other layers.

The map data store (212) caches recently used map data. As needed, the map data store (212) gets additional or updated map data from local file storage or from network resources. The device OS (250) mediates access to the storage and network resources. The map data store (212) requests map data from storage or a network resource through the device OS (250), which processes the request, as necessary requests map data from a server and receives a reply, and provides the requested map data to the map data store (212).

For example, to determine directions for a route, the map navigation tool (210) provides a start location (typically, the current location of the computing device with the map navigation tool (210)) and an end location for a destination (e.g., an address or other specific location) as part of a request for map data to the OS (250). The device OS (250) conveys the request to one or more servers, which provide surface layer data, route points that define a route, text directions for decisions at waypoints along the route, distances between waypoints along the route, and/or other map data in reply. The device OS (250) in turn conveys the map data to the map navigation tool (210).

As another example, as a user travels along a route, the map navigation tool (210) gets additional map data from the map data store (212) for rendering. The map data store (212) may cache detailed map data for the vicinity of the current location, using such cached data to incrementally change the rendered views. The map navigation tool (210) can pre-fetch map data along the route, or part of the route. Thus, as the rendered map views are updated to account for changes to the current location, the map navigation tool (210) often updates the display without the delay of requesting/receiving new map data from a server. As needed, the map data store (212) requests additional map data to render views.

The rendering engine (218) processes the view position, location data and map data, and renders a view of the map. Depending on the use scenario, the rendering engine (218) can render map data from local storage, map data from a network server, or a combination of map data from local storage and map data from a network server. In general, the rendering engine (218) provides output commands for the rendered view to the device OS (250) for output on a display. The rendering engine (218) can also provide output commands to the device OS (250) for voice output over a speaker or headphones.

The exact operations performed as part of the rendering depend on implementation. In some implementations, for map rendering, the tool determines a field of view and identifies features of the map that are in the field of view. Then, for those features, the tool selects map data elements. This may include any and all of the map data elements for the identified features that are potentially visible in the field of view. Or, it may include a subset of those potentially visible map data elements which are relevant to the navigation scenario (e.g., directions, traffic). For a given route, the rendering engine (218) graphically connects route points along the route (e.g., with a highlighted color) to show the route and graphically indicates waypoints along the route. The tool composites the selected map data elements that are visible (e.g., not obscured by another feature or label) from the view position. Alternatively, the tool implements the rendering using acts in a different order, using additional acts, or using different acts.

In terms of overall behavior, the map navigation tool can react to changes in the location of the computing device and can also react to user input that indicates a change in view position, a change in the top item in a list of directions for a route, or other change. For example, in response to a finger gesture or button input that indicates a panning instruction on the map, or upon a change to a previous item or next item in a list of directions for a route, the map navigation tool can update the map with a simple, smooth animation that translates (shifts vertically and/or horizontally) the map. Similarly, as the location of the computing device changes, the map navigation tool can automatically update the map with a simple translation animation. (Or, the map navigation tool can automatically re-position and re-render an icon that indicates the location of the computing device as the location is updated). If the change in location or view position is too large to be rendered effectively using a simple, smooth translation animation, the map navigation tool can dynamically zoom out from a first geographic position, shift vertically and/or horizontally to a second geographic position, then zoom in at the second geographic position. Such a dynamic zoom operation can happen, for example, when a phone is powered off then powered on at a new location, when the view position is re-centered to the current location of the device from far away, when the user quickly scrolls through items in a list of directions for a route, or when the user scrolls to a previous item or next item in the list of directions that is associated with a waypoint far from the current view position. The map navigation tool can also react to a change in the type of view (e.g., to switch from a map view to a list view, or vice versa), a change in details to be rendered (e.g., to show or hide traffic details).

Alternatively, the map navigation tool (210) includes more or fewer modules. A given module can be split into multiple modules, or different modules can be combined into a single layer. For example, the navigation engine can be split into multiple modules that control different aspects of navigation, or the navigation engine can be combined with the interpretation engine and/or the rendering engine. Functionality described with reference to one module (e.g., rendering functionality) can in some cases be implemented as part of another module.

Example Map Navigation UI and Screenshots

Figure 3A:
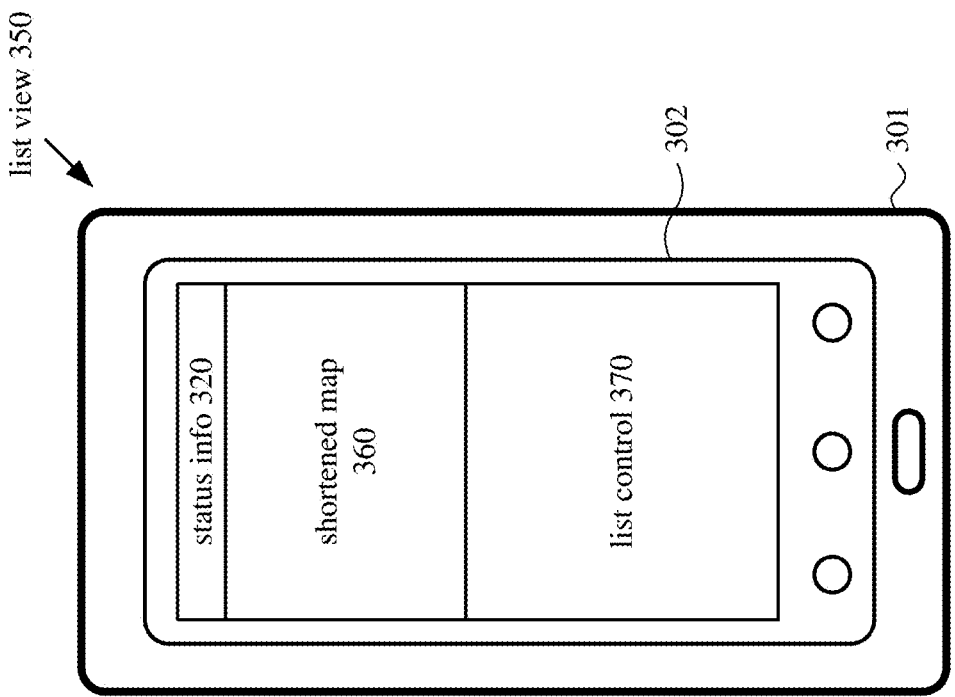
FIGS. 3*a* and 3*b* are diagrams illustrating features of a generalized map view and generalized list view rendered using a map navigation tool.
Figure 3B:
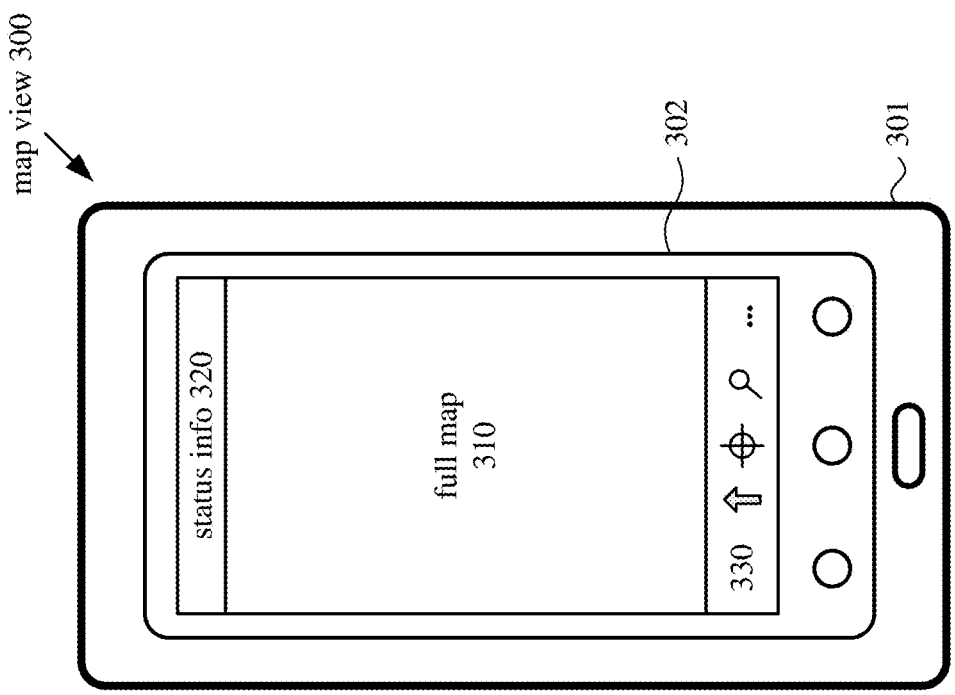
Figure 4A:
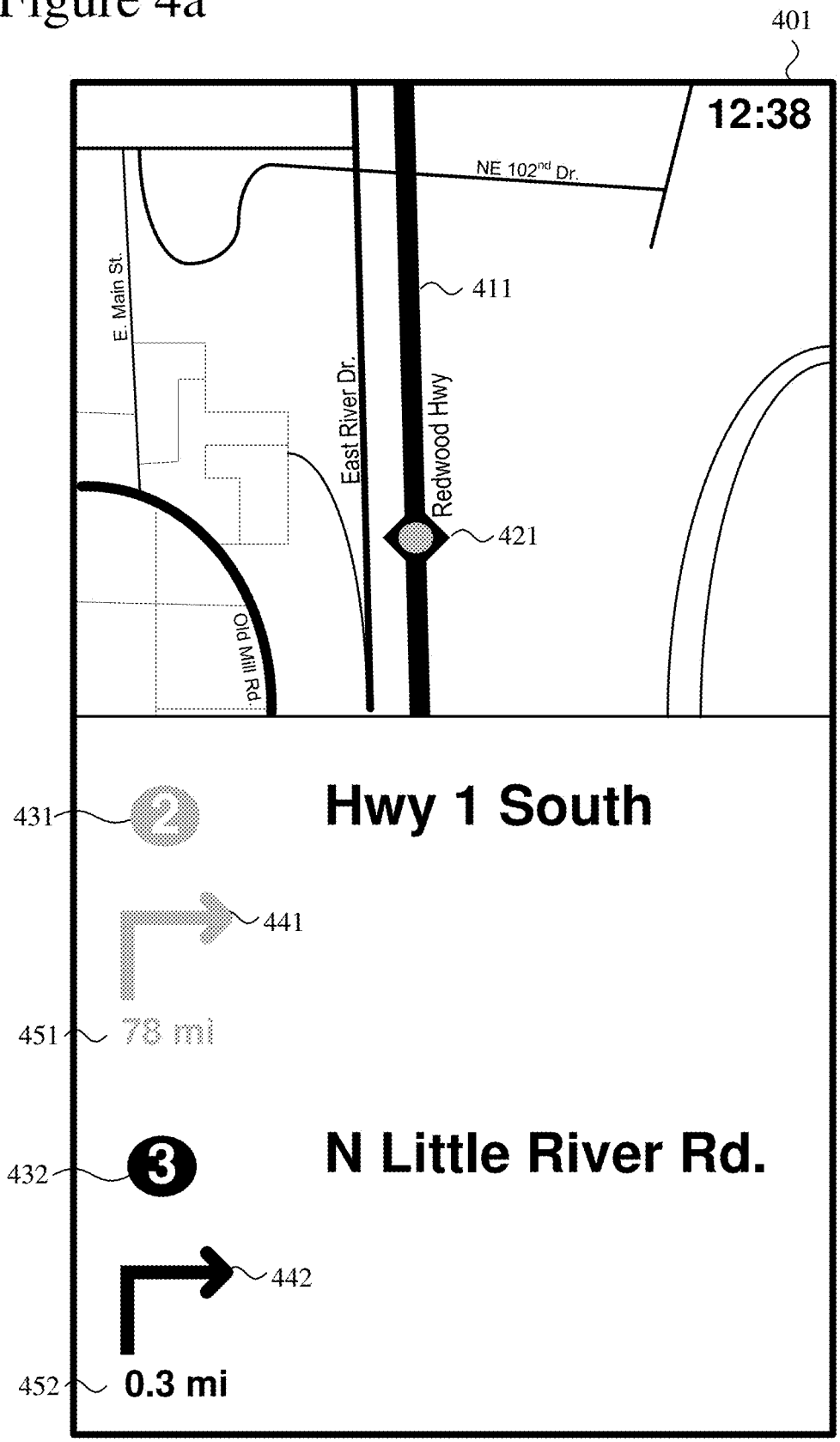
FIGS. 4*a*-4*c* are example screenshots illustrating user interface features of list views rendered using a map navigation tool.
Figure 4B:
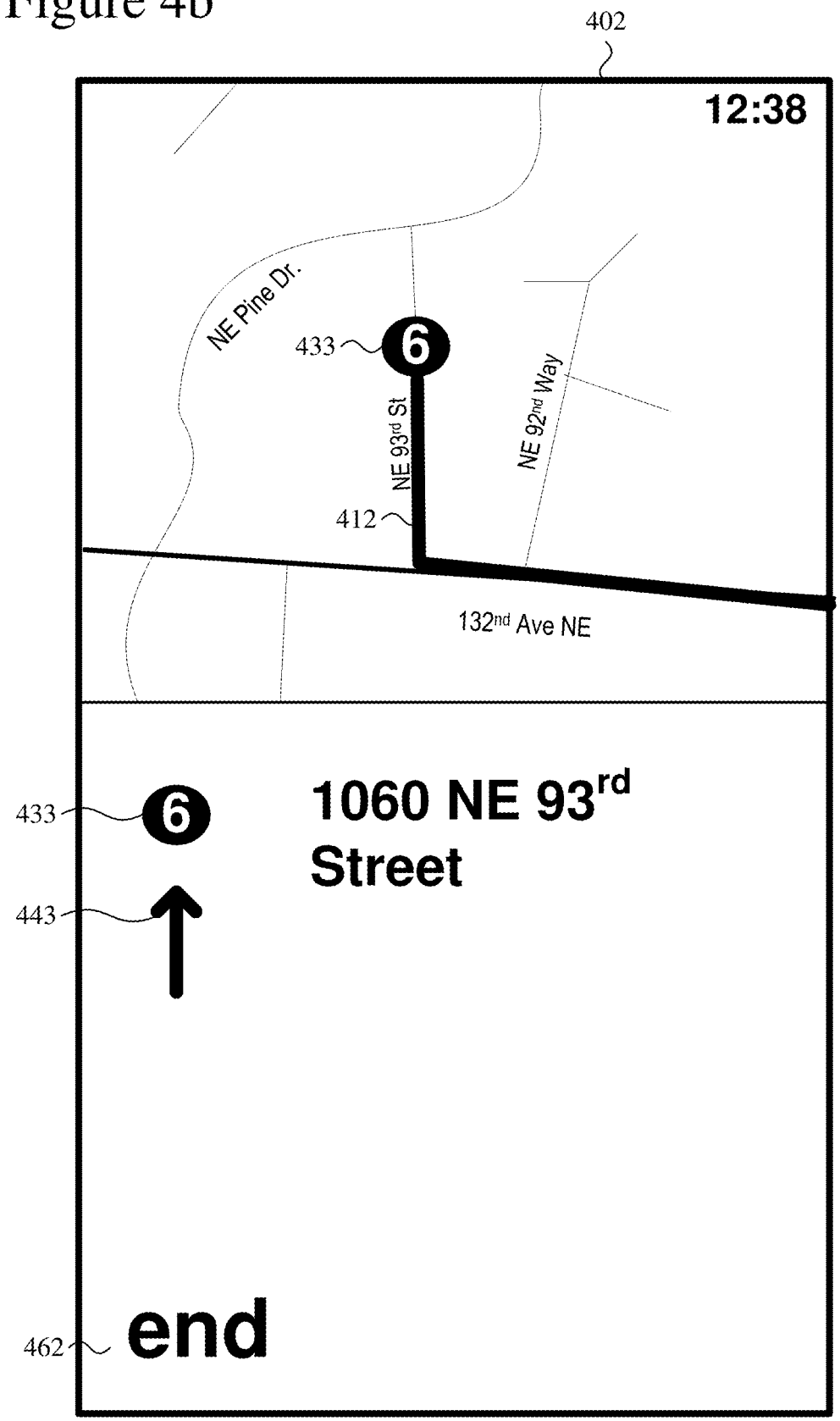
Figure 4C:

FIGS. 3a and 3b illustrate a generalized map view (300) and generalized direction list view (350), respectively, rendered using a map navigation tool of a mobile computing device (301). FIGS. 4a-4c show example screenshots (401, 402, 403) of a list view of a map navigation UI.

The device (301) includes one or more device buttons. FIGS. 3a and 3b show a single device button near the bottom of the device (301). The effect of actuating the device button depends on context. For example, actuation of the device button causes the device (301) to return to a home screen or start screen from the map navigation tool. Alternatively, the device (301) includes no device buttons.

The device (301) of FIGS. 3a and 3b includes a touchscreen (302) with a display area and three touchscreen buttons. The effect of actuating one of the touchscreen buttons depends on context and which button is actuated. For example, one of the touchscreen buttons is a search button, and actuation of the search button causes the device (301) to start a Web browser at a search page, start a search menu for contacts or start another search menu, depending on the point at which the search button is actuated. Or, one of the touchscreen buttons is a "back" button that can be used to navigate the user interface of the device. Alternatively, the device includes more touchscreen buttons, fewer touchscreen buttons or no touchscreen buttons. The functionality implemented with a physical device button can be implemented instead with a touchscreen button, or vice versa.

In the display area of the touchscreen (302), the device (301) renders views. In FIG. 3a, as part of the map view (300), the device (301) renders a full map (310) and status information (320) that overlays the top of the full map (310). The status information (320) can include time, date, network connection status and/or other information. The device (301) also renders a control section (330) that includes map navigation buttons, which depend on implementation of the map navigation tool. FIG. 3a shows a "directions" button (arrow icon), "re-center" button (crosshairs icon) and "search" button (magnifying glass icon). Actuation of the "directions" button causes the device (301) to open menu for keystroke input for a destination location. Actuation of the "center" button causes the device (301) to align the view position over the current location of the device (301). Actuation of the "search" button causes the device (301) to open menu for keystroke input for a search for a location or locations. Other buttons/controls can be accessed by actuating the ellipses, such as buttons/controls to clear the map of extra data, show/hide photographic image details, show/hide traffic data, show/hide route directions, change settings of the map navigation tool such as whether voice instructions are input or whether orientation of the view changes during progress along the route, etc. Alternatively, the device includes more map navigation buttons, fewer map navigation buttons or no map navigation buttons.

In FIG. 3b, as part of the list view (350), the device (301) renders a shortened map (360), status information (320) that overlays the top of the shortened map (360), and a list control (370). The shortened map (360) shows map details as in the full map (310) but also shows graphical details of at least part of a route between a start location and end location. The list control (370) shows text details and icons for directions along the route. FIGS. 4a-4c show example screenshots (401, 402, 403) of list views, each including a shortened map (360) and list control (370) as well as status information (320) (namely, time) that overlays the shortened map (360).

The screenshots (401, 402, 403) in FIGS. 4a-4c show different list views for a route between a start location and end location. In the screenshot (401) of FIG. 4a, a graphical icon (421) shows the current location along the route in the map portion of the list view. Part of the route (411) is shown in a highlighted color relative to the rest of the map data. The list control of the screenshot (401) includes waypoint icons (431, 432) and text details for waypoints along the route. Items in the list of direction are organized as waypoints, which represent points at which the user is given specific directions to turn, continue straight, take an exit, etc. Below the waypoint icons (431, 432), direction icons (441, 442) graphically represent the active part of the directions, e.g., to turn continue straight, take and exit associated with the respective waypoints. Distance values (451, 452) indicate the distance between waypoints (as in the distance (452) between waypoints 2 and 3) or distance between the current location and the upcoming waypoint (as in the distance (451) to waypoint 2).

The color of the waypoint icons (441, 442), text details, direction icons (441, 442) and distance values (451, 452) can change depending on the status of progress along the route. In FIG. 4a, the waypoint icon (431), text and direction icon (441) for waypoint 2 are rendered in an accent color to indicate waypoint 2 is the upcoming item in the list of directions. On the other hand, the waypoint icon (432), associated text and direction icon (442) for waypoint 3 are rendered in a neutral color to indicate waypoint 3 is further in the future.

The screenshot (402) of FIG. 4b shows the list view after the user scrolls to the end of the list of directions, which is graphically represented with text (462). Waypoint icons (433) represent a final waypoint in the map portion and list control of the list view. The map portion highlights part (412) of the route graphically. In the list control, the waypoint icon (433) is followed by text associated with the waypoint and a direction icon (443), but not a distance value since the waypoint is the final waypoint. The waypoint icon (433), associated text and direction icon (443) for the final, future waypoint are rendered in a neutral color.

The screenshot (403) of FIG. 4c shows the list view after the user scrolls back to the start of the list of directions, which is graphically represented with text (461). The map portion shows part (413) of the route graphically, but the completed part of the route is grayed out. Waypoint icons (434) represent an initial waypoint in the map portion and list control of the list view, and are also grayed out to show that the initial waypoint has been passed. Another waypoint icon (435) represents a subsequent waypoint. In the list control, space permitting, the waypoint icons (434, 435) are followed by text associated with the waypoints and direction icons (444), also grayed out, but not distance value since the waypoints have been passed. The list control also includes transit mode icons (472) that the user can actuate to switch between modes of transit (e.g., walking, car, bus).

Overview of Map Navigation with Off-Route Feedback Suppression

In an exemplary navigation scenario, a user (e.g., a user traveling in a vehicle or on foot) uses a map navigation tool to navigate along a route. In some situations, the user may need to or choose to go off-route (e.g., temporarily) while navigating along the route. For example, a user uses a map navigation tool on a mobile computing device to generate a route having a start location and an end location. If the user generates the route at some distance from the start location on the route, the user may need to travel for a while (e.g., exit a large building, walk to a car in a parking lot, turn around when traveling on a one-way street) to get to the start location. Or, the user may find the start location to be inaccessible (e.g., because of a closed road or traffic jam) after the route is generated, and may prefer to join the route at a point other than the start location (e.g., downstream from the start location at a point on the route closer to the end location). As another example, as a car in which the user is riding approaches the user's intended destination, the driver may need to park the car before the destination is actually reached, or the driver may reach the destination only to find that she must continue driving beyond the destination to find a parking area. Such user movements are examples of "user drift," in which a user moves off-route during navigation.

A map navigation tool can raise off-route events to cause output of off-route feedback (e.g., audio cues such as tones or speech, visual cues such as text or graphics) to alert the user when the user moves off route (e.g., by taking a wrong turn). Such off-route events also can be used to initiate recalculation of a route (e.g., from the user's off-route location to the intended destination). However, such events can be annoying to users that know they have not reached the start location yet, users that have been forced off-route by a detour, or users that know they have already reached their destination. Such events also can be confusing or misleading to users that are near their destination. For example, route recalculation and off-route feedback can cause a user to think that she is further from her destination than she really is, which can lead to travel delays and frustration.

Accordingly, techniques and tools are described for map navigation near a route terminus. Described techniques and tools can improve user experience in situations such as where a user has navigated near enough to a destination such that off-route feedback is no longer useful, but the user is not precisely on a route defined by a map navigation tool. For example, to simplify navigation near a terminus of a route (e.g., near an end location or a start location), a map navigation tool can provide a terminus buffer area (e.g., an end-of-route buffer area or a start-of-route buffer area) in which off-route feedback (e.g., audio or visual warnings or alerts) can be suppressed in some circumstances, such as when a user enters the terminus buffer area, which also can be referred to as a "bubble." In described examples, when off-route feedback is suppressed, output of off-route feedback is omitted for some, but not all, off-route locations and movements. For example, output of off-route feedback can be omitted when a user is at an off-route location within a terminus buffer area, but the off-route feedback may be output at other times depending on the user's future movements (e.g., movements to off-route locations outside a terminus buffer area). The off-route feedback can continue to be suppressed for a length of time (e.g., until some other event, such as a user leaving the buffer area, occurs). A map navigation tool also can disable off-route feedback in some circumstances. When off-route feedback is disabled, the map navigation tool does not output off-route feedback, regardless of the user's location or movements. As an example, a map navigation tool can disable off-route warnings for a route when a user crosses an arrival threshold and enters an arrival area associated with the route. The arrival area can be within an end-of-route buffer area. Off-route feedback that has been disabled can be re-enabled when a new route is calculated.

Techniques and tools also are described for map navigation at the start of a route, or when joining a route downstream from a start location. Described techniques and tools can improve user experience in situations such as where a user is not precisely on a route defined by a map navigation tool. For example, to simplify navigation near a start location of a route, a map navigation tool can provide a start-of-route buffer area in which off-route feedback (e.g., audio or visual warnings or alerts) can be suppressed in some circumstances. The off-route feedback can continue to be suppressed for a length of time (e.g., until some other event, such as a user leaving the start-of-route buffer area, occurs). As another example, off-route feedback can be suppressed for a user even if the user is not within a start-of-route buffer area, such as when the user generates a route at an initial location that is far away from any part of the route and then joins the route later (e.g., at the start location or downstream from the start location). A map navigation tool can automatically detect when a user has joined a route, making it unnecessary for the user to indicate an intention to start navigating, while still avoiding unnecessary off-route feedback. Described techniques and tools can be used in combination with buffer areas at other locations on a route, such as a buffer area at an end location.

In described examples, a user is considered to be typically in close proximity to a mobile computing device that implements a map navigation tool, and so certain calculations, state changes, and other acts are described as occurring in response to a user's movement or location for ease of illustration. The user's location and the location of the computing device being tracked can be considered to be the same, but this is not required. For example, a user can control from a remote location a mobile computing device that implements a map navigation tool, or the mobile computing device can be controlled in some other way.

End-of-Route Navigation Examples

In described examples, within an end-of-route buffer (which also can be referred to as a destination buffer), off-route feedback can be suppressed. For example, if a user's current location is at a distance from the route (e.g., a distance greater than a position error value) that would raise an off-route event at some other point along the route (e.g., a point near the middle of the route, outside the end-of-route buffer), output of off-route feedback (e.g., an audio and/or visual notification) that would otherwise be associated with such an off-route event can be omitted. The end-of-route buffer can help to avoid unnecessary, misleading, or annoying off-route feedback and does not require any action by the user to suppress the off-route feedback. Besides suppression of off-route feedback, other conditions also can apply to end-of-route buffer areas. For example, program states such as the list items in a list view can remained unchanged if the user re-enters the route after being off-route but within the end-of-route buffer. The user's movement can continue to be tracked while the user is within the end-of-route buffer. For example, if the user begins moving away from the destination and leaves the end-of-route buffer, off-route events can be raised, off-route feedback can be output, a new route can be calculated, or other actions can be performed. The size and shape of the buffer area can vary depending on implementation. For example, the end-of-route buffer can be configured as a circle centered on the end location of a route.

A map navigation tool also can exhibit other behavior when a user is located within an end-of-route buffer area. As an example, dynamic zoom functionality can be enabled. In an exemplary implementation, when dynamic zoom is enabled, dynamic zoom operations such as the exemplary dynamic zoom operations described above can be performed. Alternatively, other dynamic zoom operations can be performed, or dynamic zoom functionality can be disabled. As another example, map orientation can be user-defined. In an exemplary implementation, when map orientation is user-defined, orientation of a view of a map can be set such that the heading of the user's progress along the route is upward in the view of the map. The map view can be centered on the user's location, the end of the route or some other map area. Alternatively, other map orientations or map views can be used. As another example, idle timer reset functionality can be enabled. In an exemplary implementation, when idle timer reset functionality is enabled, an idle timer that initiates screen lock for a mobile computing device when it expires (e.g., for security purposes) is configured to reset before expiration to prevent screen lock from occurring. The configuration of the idle timer can be revisited (e.g., a determination of whether to enable or disable idle timer reset functionality can be made) at regular intervals (e.g., every 5 minutes), or the configuration can be changed (e.g., to allow screen lock) in response to an event (e.g., where the user has exited the map navigation tool or some other event has occurred). The length of time that the idle timer can run before resetting can vary depending on implementation. Alternatively, idle timer reset functionality can be disabled or treated in some other way. As another example, tap input functionality can be enabled. In an exemplary implementation, when tap input functionality is enabled, a tap on a touchscreen can cause an upcoming list item in a list of directions associated with a route to be displayed and announced (e.g., audibly). Alternatively, tap input can be used to perform some other function, or tap input functionality can be disabled.

A map navigation tool can raise an arrive-at-destination event when a user crosses the arrival threshold into an arrival area. For example, the map navigation tool can generate an audio cue to indicate that the last list item in a list of directions has been completed and disable further off-route feedback. The arrival threshold can help to avoid unnecessary, misleading, confusing, or annoying off-route feedback. Other conditions also can apply to arrival areas. For example, program states such as the list items in a list view can remained unchanged despite any further movement by the user (e.g., going off-route, re-entering the route) after crossing the arrival threshold. Further tracking of the user's movement with regard to the route associated with the arrival threshold can be omitted. For example, if the user begins moving away from the destination and leaves the arrival area and an end-of-route buffer area, off-route events and route recalculation can be omitted. The arrival threshold can be positioned within an end-of-route buffer area. For example, the arrival threshold can be represented by a circle centered on the end location of a route, within a larger circle that represents an end-of-route buffer area. The buffer area (as determined by, for example, the radius of the circle that represents an arrival threshold) can vary depending on implementation. In one implementation, a radius (e.g., 100 meters) is used based on an observation of a location framework in which a high percentage of position fixes (e.g., 95%) are accurate to within a distance corresponding to the radius (e.g., 100 meters). The actual level of accuracy for position fixes can vary.

A map navigation tool also can exhibit other behavior when an arrive-at-destination event is raised (e.g., when a user enters an arrival area). As an example, dynamic zoom functionality can be disabled. Alternatively, dynamic zoom functionality can be enabled. As another example, map orientation can be a north-up orientation where north is upward in the map view. The map view can be centered on the user's location, the end of the route or some other map area. Alternatively, other map orientations or map views can be used. As another example, idle timer reset functionality can be disabled. In an exemplary implementation, when idle timer reset functionality is disabled, an idle timer that initiates screen lock for a mobile computing device when it expires (e.g., for security purposes) is configured not to reset before expiration, thereby allowing screen lock to occur when the idle timer expires. The length of time that the idle timer can run before expiring can vary depending on implementation. Alternatively, idle timer reset functionality can be enabled, or screen lock functionality can be treated in some other way. As another example, tap input functionality can be enabled. In an exemplary implementation, when tap input functionality is enabled, a tap on the touchscreen can cause a previous list item in a list of directions associated with a route to be displayed and announced (e.g., audibly). Alternatively, tap input can be used to perform some other function, or tap input functionality can be disabled.

FIGS. 5a-5e show example representations of a route (510) between a start location (labeled A) and an end location (labeled B) with an associated arrival area (530) and end-of-route buffer area (540). In FIGS. 5a-5e, a triangular icon (502) shows locations of a user along the route (510) and indicates movement directions. Dashed lines (520, 522) indicate an area which is considered to be on the route (510). The distance from the route (510) to each of the dashed lines (520, 522) can be represented by a position error value. The position error value can be used to account for errors in position fixes. In one implementation, the position error value is 50 meters. The position error value can vary depending on implementation. The inner dashed circle represents an arrival area (530). The radius of the arrival area (530) can be represented by an arrival threshold value (e.g., 100 meters). The outer dashed circle represents an end-of-route buffer area (540). The radius of the end-of-route buffer area can be represented by an end-of-route buffer value (e.g., a value greater than 100 meters).

Figure 5A:
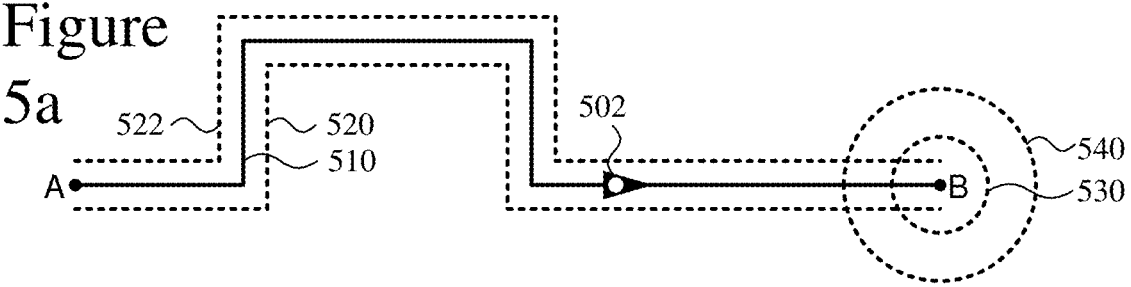
FIGS. 5*a*-5*e* are example representations of a route with an associated arrival area and end-of-route buffer area defined in a map navigation tool.
Figure 5B:
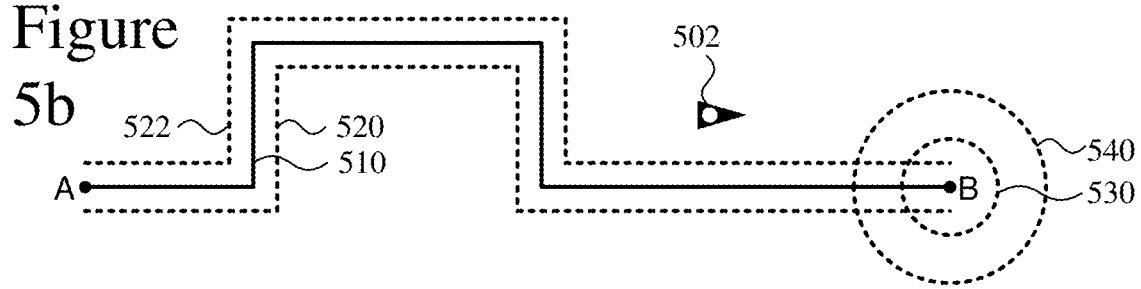
Figure 5C:
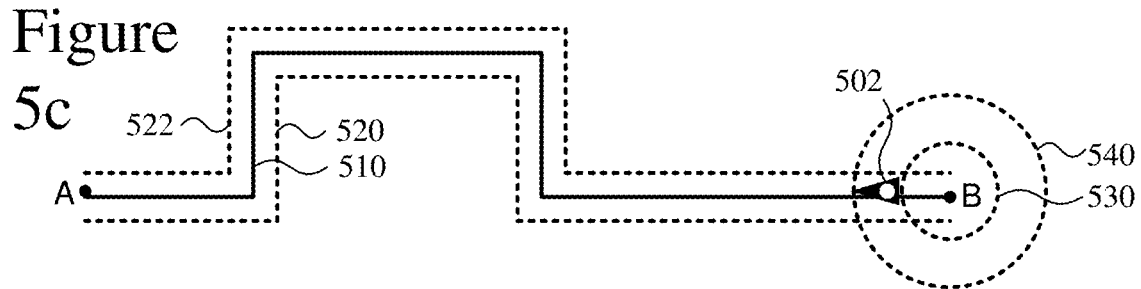
Figure 5D:
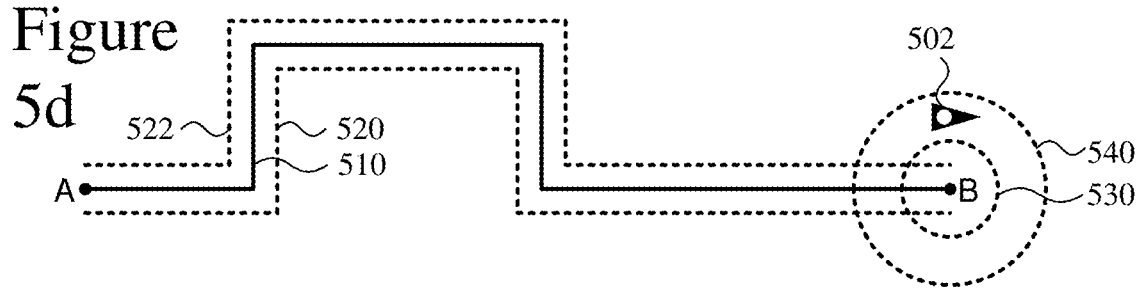
Figure 5E:
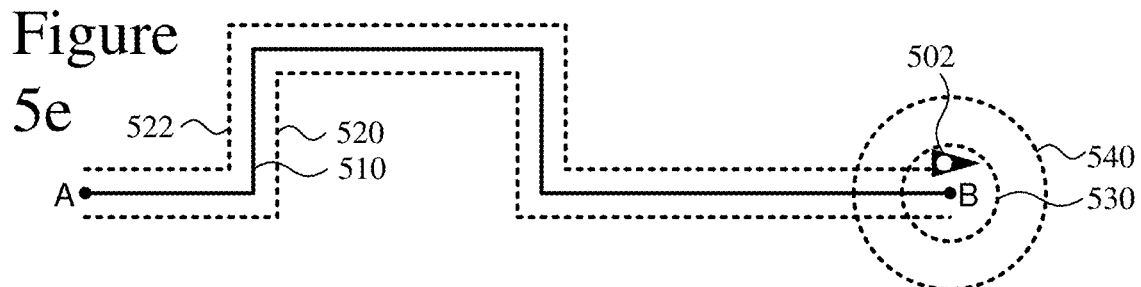

In the example shown in FIG. 5a, the icon (502) is located on the route (510). The movement direction indicated by the icon (502) in FIG. 5a is considered an on-route direction (movement toward the end location). In the example shown in FIG. 5b, the icon (502) is located off the route (510). FIG. 5b represents a situation where an off-route event can be raised, and off-route feedback can be presented to a user (e.g., via visual output or audio output). In the example shown in FIG. 5c, the icon (502) is located on the route (510) but within the end-of-route buffer area (540), and the indicated movement direction is considered an off-route direction (movement away from the end location). In the example shown in FIG. 5d, the icon (502) is located off the route (510) but within the end-of-route buffer area (540). FIGS. 5c and 5d represent exemplary situations in which an off-route event could be raised, except that the respective locations represented by the icon (502) are within the end-of-route buffer area (540), so off-route feedback can be suppressed. In the example shown in FIG. 5e, the icon (502) is located off the route (510) but within the arrival area (530). FIG. 5e represents an exemplary situation in which an arrive-at-destination event can be raised and further off-route events can be disabled.

Features that are represented as shown in FIGS. 5a-5e also can be represented in other ways. For example, the arrival area (530) and the end-of-route buffer area (540) can be of any size or shape. As another example, the end location (A) need not be centered in the arrival area (530) or the end-of-route buffer area (540). As another example, the arrival area (530) and the end-of-route buffer area (540) need not be concentric. Further, although features shown in FIGS. 5a-5e can be rendered for display, such rendering is not required. A subset of features can be rendered for display while other features are not rendered for display. For example, in a map navigation tool, the icon (502) and part of the route (510), can be rendered for display to indicate a user's location relative to the route, while other features (e.g., the arrival area (530), the end-of-route buffer area (540), the dashed lines (520, 522)) are not rendered for display. The number and type of features in a subset of features that are rendered for display can vary depending on implementation, user preferences, or program states such as the state of a map view. For example, if a user is far away from the route (510), a map view that is centered on the icon (102) may not show any part of the route (510), and a map view that is centered on the end location (B) of the route (510) may not show the icon (102). Still further, features that are rendered for display in a map navigation tool can vary in detail from the examples shown in FIGS. 5a-5e. For example, the icon (502) can be of any shape or size, and need not indicate movement direction.

Figure 6:
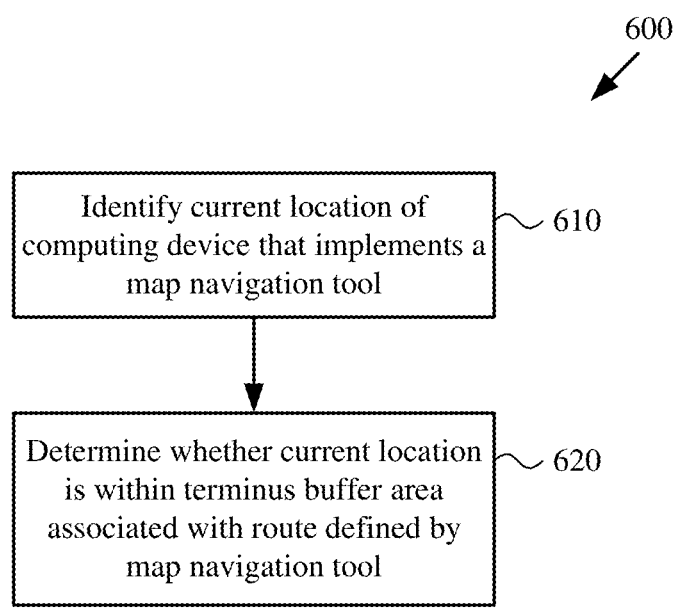
FIG. 6 is a flowchart showing a generalized technique for map navigation using a terminus buffer area.
Figure 7:
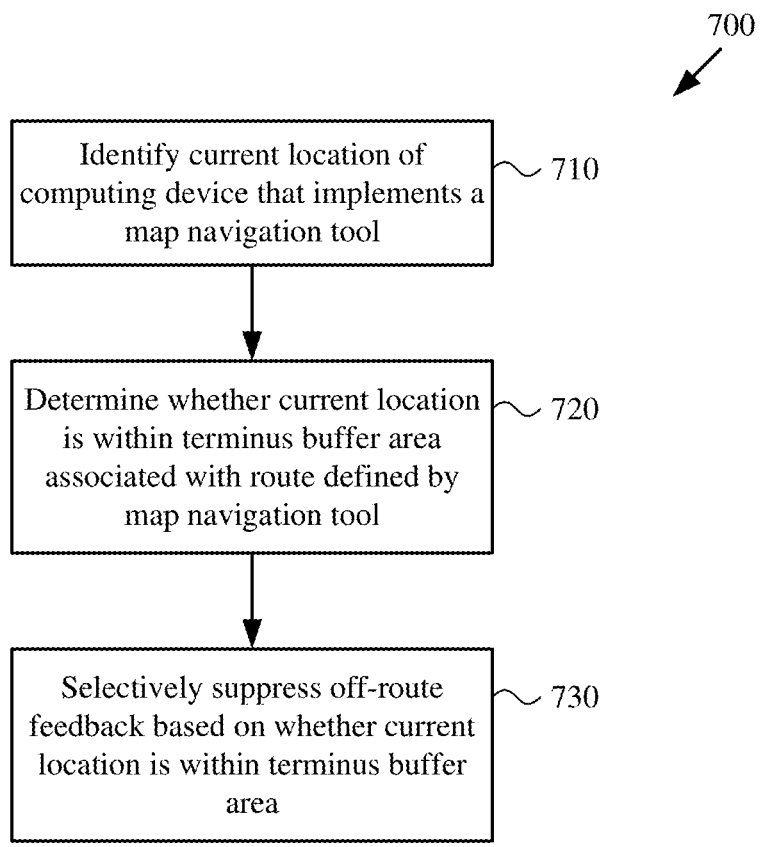
FIG. 7 is a flowchart showing a generalized technique for selectively suppressing off-route feedback using a terminus buffer area.

FIG. 6 shows a generalized technique (600) for map navigation using a terminus buffer area. A computing device such as a mobile computing device can perform the technique (600). For example, a mobile computing device that implements a map navigation tool identifies (610) a current location of the mobile computing device (e.g., a mobile computing device held or controlled by a user). The mobile computing device determines (620) whether the current location is within a terminus buffer area (e.g., an end-of-route buffer area) associated with a route defined by the map navigation tool. For example, the mobile computing device can calculate a distance between the current location and a terminus location (e.g., an end location that marks a user's destination) associated with the route, and compare the distance with a terminus buffer value (e.g., an end-of-route buffer value). The mobile computing device can selectively suppress off-route feedback based on whether the current location is within the terminus buffer area. In the exemplary technique (700) shown in FIG. 7, a mobile computing device that implements a map navigation tool identifies (710) a current location of the mobile computing device; determines (720) whether the current location is within a terminus buffer area associated with a route defined by the map navigation tool; and selectively suppresses (730) off-route feedback based on whether the current location is within the terminus buffer area. For example, off-route feedback is suppressed if the current location is within the terminus buffer area, and off-route feedback is not suppressed if the current location is outside the terminus buffer area. Off-route feedback can be output (e.g., audio output such as speech can be output via a speaker, visual output such as text or graphics can be rendered for display) in response to an off-route event if output feedback is not suppressed. The terminus buffer area can surround a terminus location associated with the route. For example, an end-of-route buffer area can be a circular area that surrounds an end location of the route.

Figure 8:
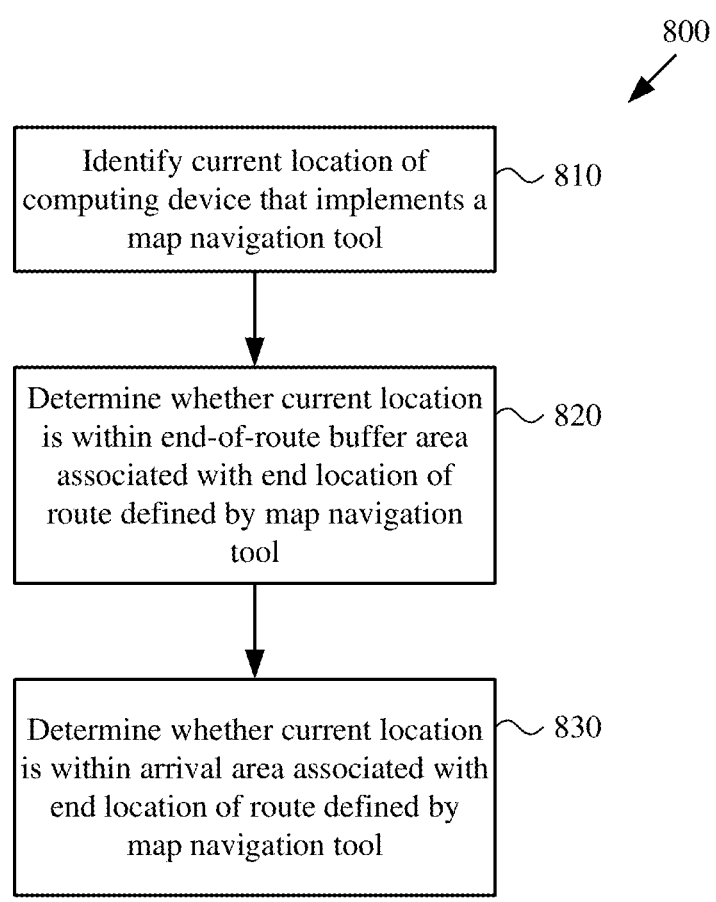
FIG. 8 is a flowchart showing a generalized technique for map navigation using an end-of-route buffer area and an arrival area.

FIG. 8 shows a generalized technique (800) for map navigation using an end-of-route buffer area and an arrival area. A computing device such as a mobile computing device can perform the technique (800). For example, a mobile computing device that implements a map navigation tool identifies (810) a current location of the mobile computing device (e.g., a mobile computing device held or controlled by a user). The mobile computing device determines (820) whether the current location of the mobile computing device is within an end-of-route buffer area associated with an end location of a route defined by the map navigation tool. For example, the mobile computing device can calculate a distance between the current location of the mobile computing device and the end location of the route, and compare the distance with an end-of-route buffer value. The mobile computing device determines (830) whether the current location of the mobile computing device is within an arrival area associated with the end location of the route. For example, the mobile computing device can calculate a distance between the current location of the mobile computing device and the end location of the route, and compare the distance with an arrival threshold value. The mobile computing device can selectively raise an arrive-at-destination event. For example, if the distance is less than the arrival threshold value, the arrive-at-destination event is raised, and if the distance is greater than the arrival threshold value, the arrive-at-destination event is not raised. The mobile computing device can selectively suppress off-route feedback based on whether the current location of the mobile computing device is within the end-of-route buffer area. The arrival area can be surrounded by the end-of-route buffer area. For example, the two areas can be represented by concentric circles with radii equal to the end-of-route buffer value and the arrival threshold value, respectively.

Figure 9:
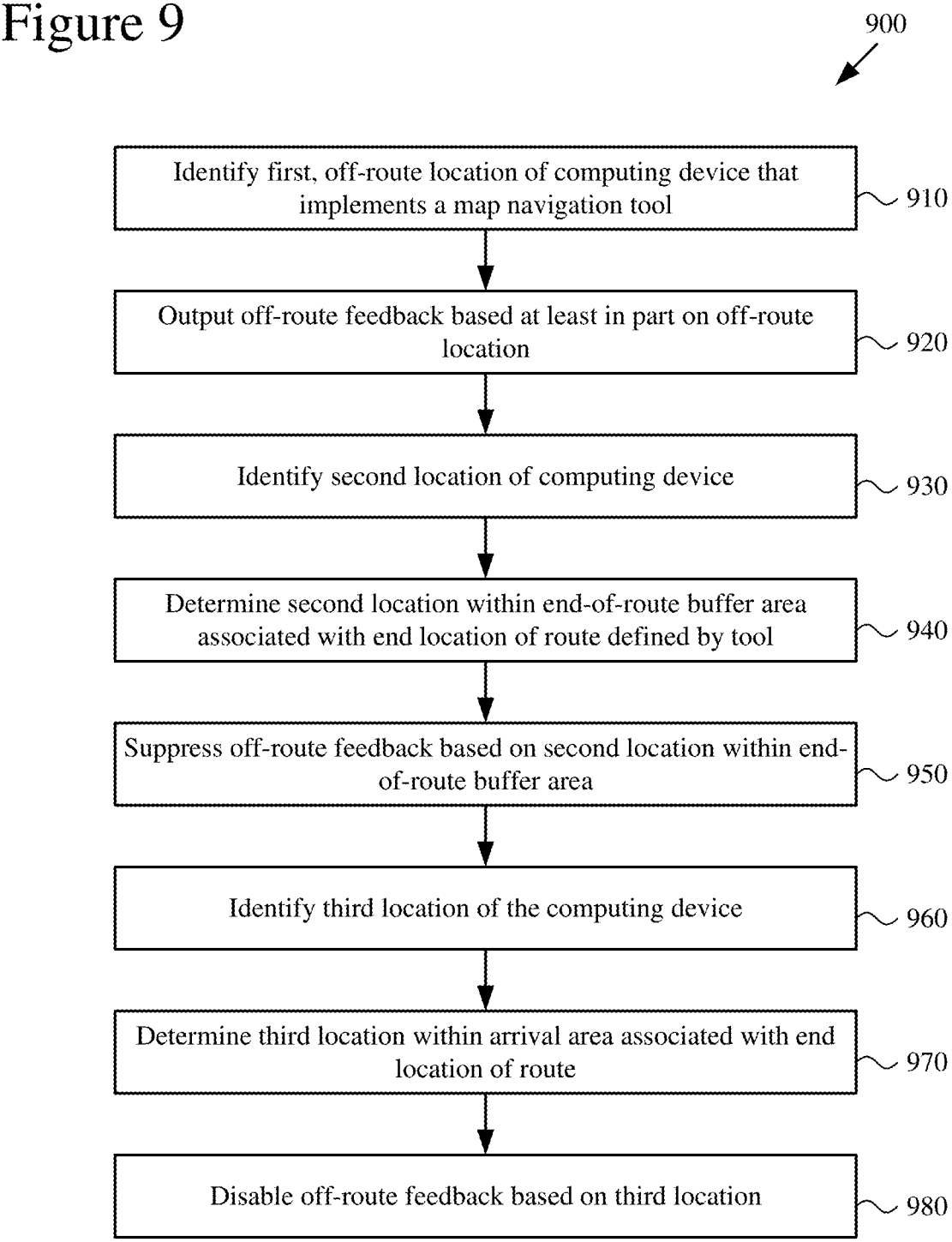
FIG. 9 is a flowchart showing a detailed technique for map navigation using an end-of-route buffer area and an arrival area.

FIG. 9 shows an exemplary detailed technique (900) for map navigation using an end-of-route buffer area and an arrival area. A computing device such as a mobile computing device can perform the technique (900). For example, a mobile computing device that implements a map navigation tool identifies (910) a first, off-route location of the computing device. The mobile computing device outputs (920) off-route feedback based at least in part on the off-route location. The mobile computing device identifies (930) a second location of the computing device and determines (940) that the second location is within an end-of-route buffer area associated with an end location of a route defined by the map navigation tool. The mobile computing device suppresses (950) off-route feedback based on the second location within the end-of-route buffer area. The mobile computing device identifies (960) a third location of the computing device and determines (970) that the third location is within an arrival area associated with the end location of the route. The mobile computing device disables (980) off-route feedback based on the third location.

Figure 10:
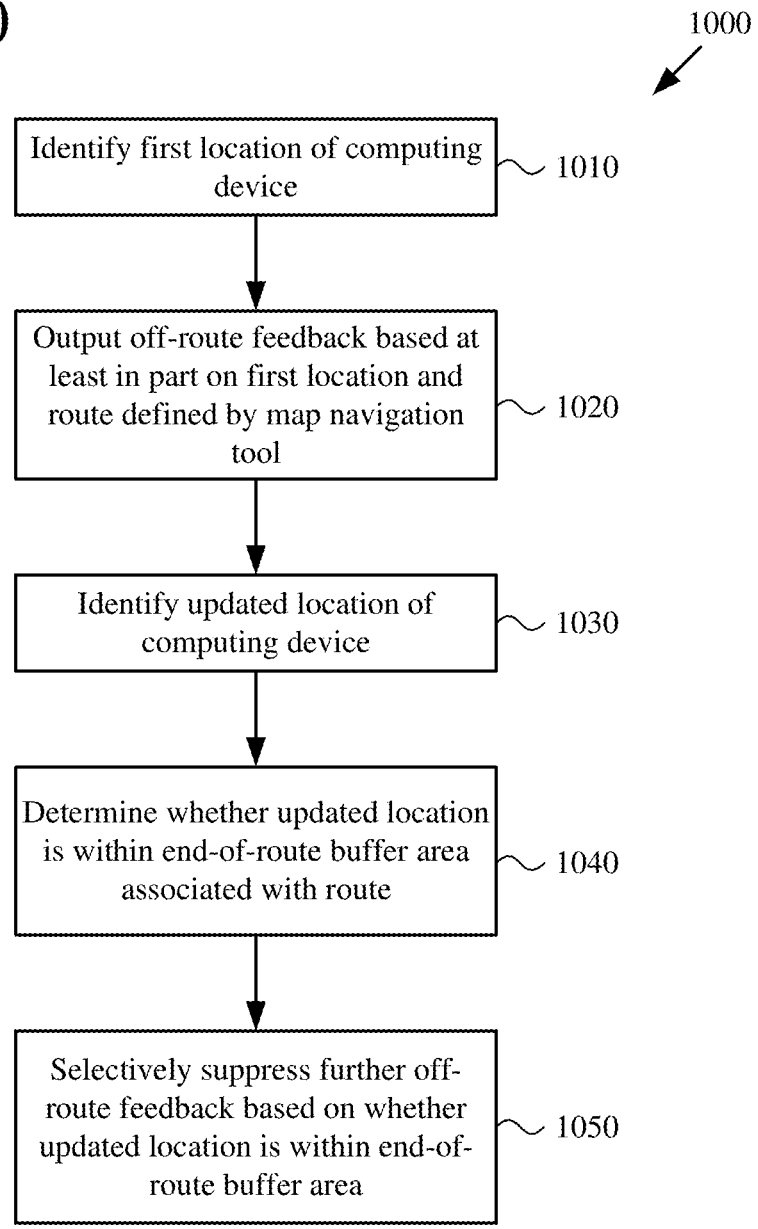
FIG. 10 is a flowchart showing a technique for outputting and then selectively suppressing off-route feedback based on whether an updated location is within an end-of-route buffer area.

FIG. 10 shows a technique for outputting and then selectively suppressing off-route feedback based on whether an updated location is within an end-of-route buffer area. A computing device such as a mobile computing device can perform the technique (1000). For example, a mobile computing device identifies (1010) a first location of the mobile computing device (e.g., a mobile computing device held or controlled by a user). The mobile computing device outputs (1020) off-route feedback based at least in part on the first location and a route defined by a map navigation tool. For example, the mobile computing device outputs off-route feedback if the device is off-route, but not within an end-of-route buffer area. The mobile computing devices identifies (1030) an updated location of the mobile computing device (e.g., the location of the mobile computing device is updated after a user holding the mobile computing device has moved some distance). The mobile computing device determines (1040) whether the updated location is within an end-of-route buffer area associated with the route. The mobile computing device selectively suppresses (1050) further off-route feedback based on whether the updated location is within the end-of-route buffer area. For example, if the updated location is within the end-of-route buffer area, further off-route feedback is suppressed, and if the updated location is outside the end-of-route buffer area, further off-route feedback is not suppressed. The mobile computing device also can determine movement direction, such as by performing position calculations at different points in time. A determination to output off-route feedback can be based on movement direction. For example, a mobile computing device can output off-route feedback if a movement direction indicates that a user is on-route but moving in the wrong direction (e.g., away from the destination). Off-route feedback can be selectively suppressed independent of movement direction. For example, if the updated location is within the end-of-route buffer area, further off-route feedback can be suppressed regardless of movement direction. Such feedback suppression can be useful, for example, where a user is performing several turns (e.g., in a parking area) in the end-of-route buffer area and does not need to be alerted when moving away from the destination.

Start-of-Route and Route-Joining Examples

In described examples, at locations within a start-of-route buffer area, off-route feedback can be suppressed. For example, if a user's current location is at a distance from the route (e.g., a distance greater than a position error value) that would raise an off-route event at some other point along the route (e.g., a point near the middle of the route, outside the start-of-route buffer), output of off-route feedback (e.g., an audio and/or visual notification) that would otherwise be associated with such an off-route event can be omitted. The start-of-route buffer area can help to avoid unnecessary, misleading, or annoying off-route feedback and does not require any action by the user to suppress the off-route feedback. A user's movement can continue to be tracked while the user is within the start-of-route buffer area. For example, if the user begins moving away from the start location and leaves the start-of-route buffer area, off-route events can be raised, off-route feedback can be output, a new route can be calculated, or other actions can be performed. The size and shape of the start-of-route buffer area can vary depending on implementation, and can be adjusted to account for factors such as an expected amount of user drift. For example, the start-of-route buffer area can be represented by a circle centered on the start location of a route, and a dynamic radius can be used that varies depending on the distance of a user's current location from a start location of a route.

In described examples, a user can use a map navigation tool to generate a route while the user is at a location within a start-of-route buffer area. The map navigation tool can track a distance between the user's location and the start location. If the distance is decreasing, the map navigation tool can infer that the user is proceeding to the start location and can suppress off-route feedback. If the distance is increasing (e.g., increasing at a rate greater than a set threshold), the map navigation tool can infer that the user is not proceeding to the start location and can raise an off-route event and allow off-route feedback to be output. The distance (d) between the user's location and the start location can be expressed as d=distance(mePOI, <start location>), where mePOI represents the user's current location, and distance( ) is a distance function.

A map navigation tool also can exhibit other behavior when a user's current location is within a start-of-route buffer area. As an example, dynamic zoom functionality can be disabled. Alternatively, dynamic zoom functionality can be enabled. As another example, map orientation can be a north-up orientation where north is upward in the map view. The map view can be centered on the user's location, the start of the route, or some other map area. Alternatively, other map orientations can be used. As another example, idle timer reset functionality can be enabled. In an exemplary implementation, when idle timer reset functionality is enabled, an idle timer that initiates screen lock when it expires (e.g., for security purposes) is configured to reset before expiration to prevent screen lock from occurring. The configuration of the idle timer can be revisited (e.g., a determination of whether to enable or disable idle timer reset functionality can be made) at regular intervals (e.g., every 5 minutes), or the configuration can be changed (e.g., to allow screen lock) in response to an event (e.g., where the user has exited the map navigation tool or some other event has occurred). The length of time that the idle timer can run before resetting can vary depending on implementation. Alternatively, idle timer reset functionality can be disabled or treated in some other way. As another example, tap input functionality can be enabled. In an exemplary implementation, when tap input functionality is enabled, a tap on a touchscreen can cause the first list item in a list of directions associated with the route to be displayed and announced (e.g., audibly). Alternatively, tap input can be used to perform some other function, or tap input functionality can be disabled.

In described examples, a user also can use a map navigation tool to generate a route while the user is at a location outside a start-of-route buffer area. For example, a user can generate a route at a location that is far away from any point on the route, and can travel to the start location or join the route downstream from the start location. A map navigation tool can exhibit behavior when a user's current location is outside a start-of-route buffer area that is similar in some respects to behavior exhibited by the tool when the user's current location is within the start-of-route buffer area. As an example, dynamic zoom functionality can be disabled. Alternatively, dynamic zoom functionality can be enabled. As another example, map orientation can be a north-up orientation where north is upward in the map view. The map view can be centered on the user's location, the start of the route or some other map area. Alternatively, other map orientations or map views can be used. As another example, tap input functionality can be enabled. In an exemplary implementation, when tap input functionality is enabled, a tap on the touchscreen can cause the first list item in a list of directions associated with the route to be displayed and announced (e.g., audibly). Alternatively, tap input can be used to perform some other function, or tap input functionality can be disabled.

A map navigation tool also can exhibit behavior when a user's current location is outside a start-of-route buffer area that differs in some respects from behavior exhibited by the tool when the user's current location is within the start-of-route buffer area. As an example, idle timer reset functionality can be disabled. In an exemplary implementation, when idle timer reset functionality is disabled, an idle timer that initiates screen lock when it expires (e.g., for security purposes) is configured not to reset before expiration, thereby allowing screen lock to occur when the idle timer expires. The length of time that the idle timer can run before expiring can vary depending on implementation. Alternatively, idle timer reset functionality can be enabled, or screen lock functionality can be treated in some other way.

A map navigation tool also can exhibit behavior as described above when a user's current location is outside a start-of-route buffer area, and then switch to an on-route state when the user joins the route or enters a start-of-route buffer area after being off-route and outside the start-of-route buffer area. For example, a user can voluntarily take another path or be prevented from reaching the start location due to unexpected detours, one-way streets, or other obstacles, and then join the route downstream from the start location. As another example, a user can leave the route and then rejoin the route. As another example, a user can enter a start-of-route buffer area after traveling to the area from a distant, off-route location, and then join the route. In any of the described examples, the map navigation tool can alert a user (e.g., with an audible tone) when the route is joined.

A map navigation tool can exhibit on-route behavior that differs from off-route behavior when a user joins a route after entering a start-of-route buffer area from an off-route location, or otherwise joins a route from an off-route location (e.g., by joining the route for the first time downstream from the start location, or by rejoining the route after leaving the route). As an example, dynamic zoom functionality can be enabled. In an exemplary implementation, when dynamic zoom is enabled, dynamic zoom operations such as the exemplary dynamic zoom operations described above can be performed. Alternatively, other dynamic zoom operations can be performed, or dynamic zoom functionality can be disabled. As another example, map orientation can be user-defined. In an exemplary implementation, when map orientation is user-defined, orientation of a view of a map can be set such that the heading of the user's progress along the route is upward in the view of the map. The map view can be centered on the user's location, the start of the route or some other map area. Alternatively, other map orientations or map views can be used. As another example, idle timer reset functionality can be enabled. In an exemplary implementation, when idle timer reset functionality is enabled, an idle timer that initiates screen lock when it expires (e.g., for security purposes) is configured to reset before expiration to prevent screen lock from occurring. The configuration of the idle timer can be revisited (e.g., a determination of whether to enable or disable idle timer reset functionality can be made) at regular intervals (e.g., every 5 minutes), or the configuration can be changed (e.g., to allow screen lock) in response to an event (e.g., where the user has exited the map navigation tool). The length of time that the idle timer can run before resetting can vary depending on implementation. Alternatively, idle timer reset functionality can be disabled or treated in some other way. As another example, tap input functionality can be enabled. In an exemplary implementation, when tap input functionality is enabled, a tap on the touchscreen can cause an upcoming list item in a list of directions to be displayed and announced (e.g., audibly). Alternatively, tap input can be used to perform some other function, or tap input functionality can be disabled.

FIGS. 11a-11d show example representations of a route (1110) between a start location (labeled A) with an associated start-of-route buffer area (1130) and an end location (labeled B). In FIGS. 11a-11d, a triangular icon (1102) shows locations of a user along the route (1110) and indicates movement directions. Dashed lines (1120, 1122) indicate an area which is considered to be on the route (1110). The distance from the route (1110) to each of the dashed lines (1120, 1122) can be represented by a position error value. The position error value can be used to account for errors in position fixes. In one implementation, the position error value is 50 meters. The position error value can vary depending on implementation. The dashed circle represents the start-of-route buffer area (1130). The radius of the start-of-route buffer area (1130) can be represented by a start-of-route buffer value (e.g., a value greater than the position error value).

Figure 11A:
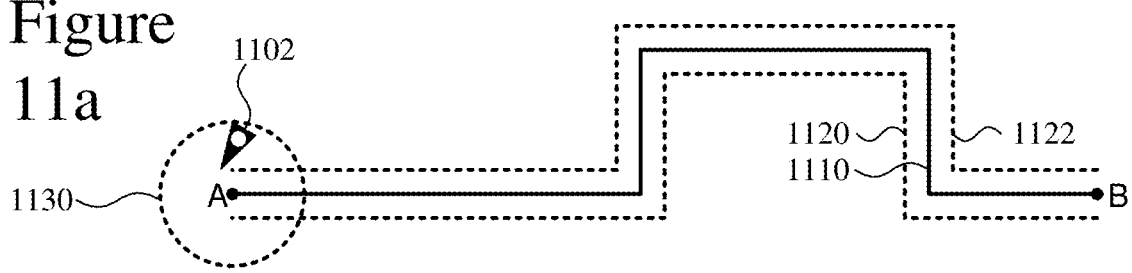
FIGS. 11*a*-11*d* are diagrams showing example representations of a route with an associated start-of-route buffer area defined in a map navigation tool.
Figure 11B:
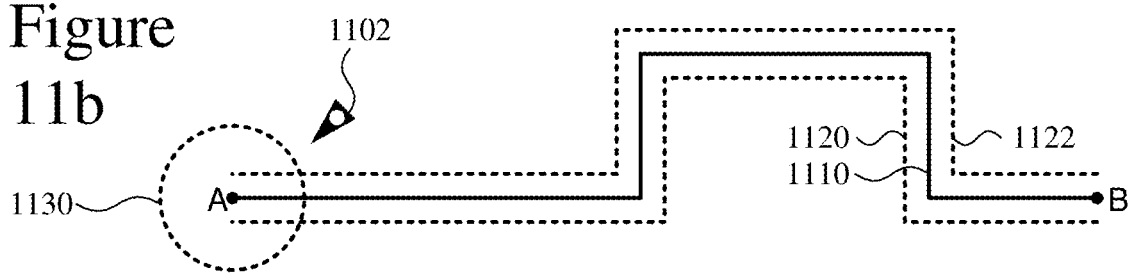
Figure 11C:
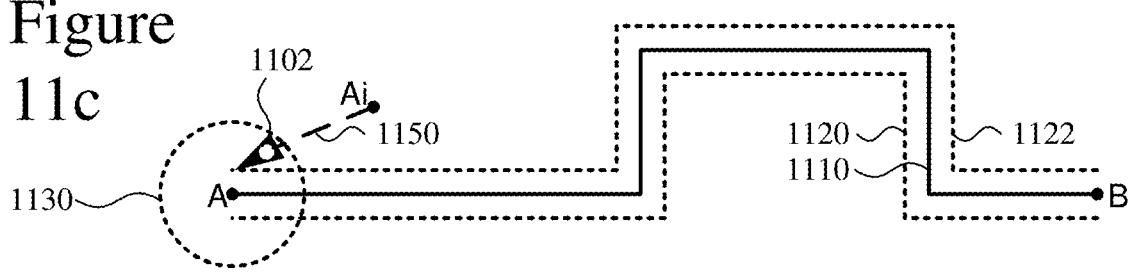
Figure 11D:
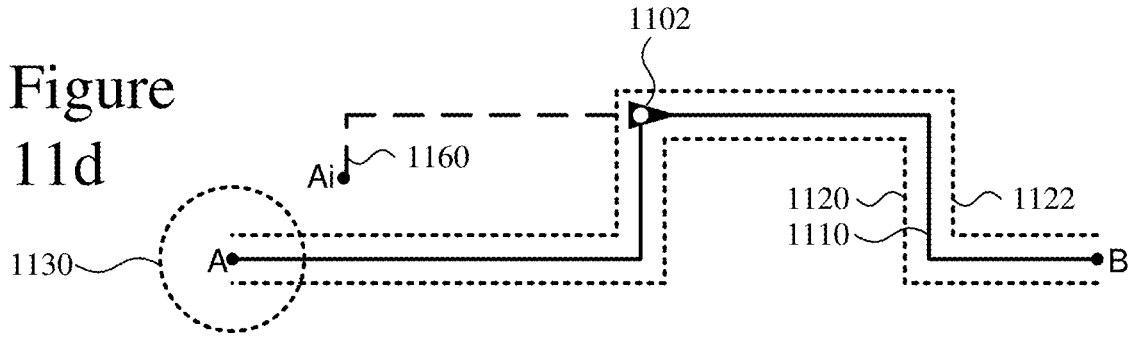

In the example shown in FIG. 11a, the icon (1102) is located within the start-of-route buffer area (1130). The movement direction indicated by the icon (1102) in FIG. 11a is toward the start location. FIG. 11a represents a situation where off-route feedback can be suppressed. In the example shown in FIG. 11b, the icon (1102) is located off the route (1110) and outside the start-of-route buffer area (1130). However, FIG. 11b represents another situation where off-route feedback can be suppressed. For example, if a user generated the route (1110) at the location indicated by the icon (1102), off-route feedback can be suppressed while the user proceeds to the start location (as shown in FIG. 11c) or joins the route downstream from the start location (as shown in FIG. 11d). In the example shown in FIG. 11c, the icon (1102) has moved from an initial position (labeled "Ai") along the path shown by the dashed line (1150) and is now located within the start-of-route buffer area (1130). In the example shown in FIG. 11d, the icon (1102) has moved from an initial position (labeled "Ai") along the path shown by the dashed line (1160) and is now located on the route (1110) at a location that is downstream from the start location.

Features that are represented as shown in FIGS. 11a-11d also can be represented in other ways. For example, the start-of-route buffer area (1130) can be of any size or shape. As another example, the start location (A) need not be centered in the start-of-route buffer area (1130). Further, although features shown in FIGS. 11a-11d can be rendered for display, such rendering is not required. A subset of features can be rendered for display while other features are not rendered for display. For example, in a map navigation tool, the icon (1102) and part of the route (1110), can be rendered for display to indicate a user's location relative to the route, while other features (e.g., the start-of-route buffer area (1130), the dashed lines (1120, 1122)) are not rendered for display. The number and type of features in a subset of features that are rendered for display can vary depending on implementation, user preferences, or program states such as the state of a map view. For example, if a user is far away from the route (1110), a map view that is centered on the icon (1102) may not show any part of the route (1110), and a map view that is centered on the start location (A) of the route (1110) may not show the icon (1102). Still further, features that are rendered for display in a map navigation tool can vary in detail from the examples shown in FIGS.

11a-11d. For example, the icon (1102) can be of any shape or size, and need not indicate movement direction.

FIG. 12 shows an exemplary technique (1200) for performing map navigation using a start-of-route buffer area associated with a route defined by a map navigation tool. A computing device such as a mobile computing device can perform the technique (1200). For example, a mobile computing device that implements the map navigation tool identifies (1210) a current location of the mobile computing device, and determines (1220) whether the current location is within a start-of-route buffer area associated with a start location of the route. For example, the mobile computing device can calculate a distance between the current location and the start location, and compare the distance with a start-of-route buffer value (e.g., a radius of a circle that represents the start-of-route buffer area). The mobile computing device selectively suppresses (1230) off-route feedback based on whether the current location is within the start-of-route buffer area. For example, if the current location is within the start-of-route buffer area, off-route feedback is suppressed, and if the current location is outside the start-of-route buffer area, off-route feedback is not suppressed. The mobile computing device can output off-route feedback (e.g., audio output such as speech, visual output such as text or graphics) in response to an off-route event if off-route feedback is not suppressed. The start-of-route buffer value can be greater than a position error value. The size of the start-of-route buffer area can be variable based on, for example, a distance between the current location of the mobile computing device and the start location of the route.

Figure 13:
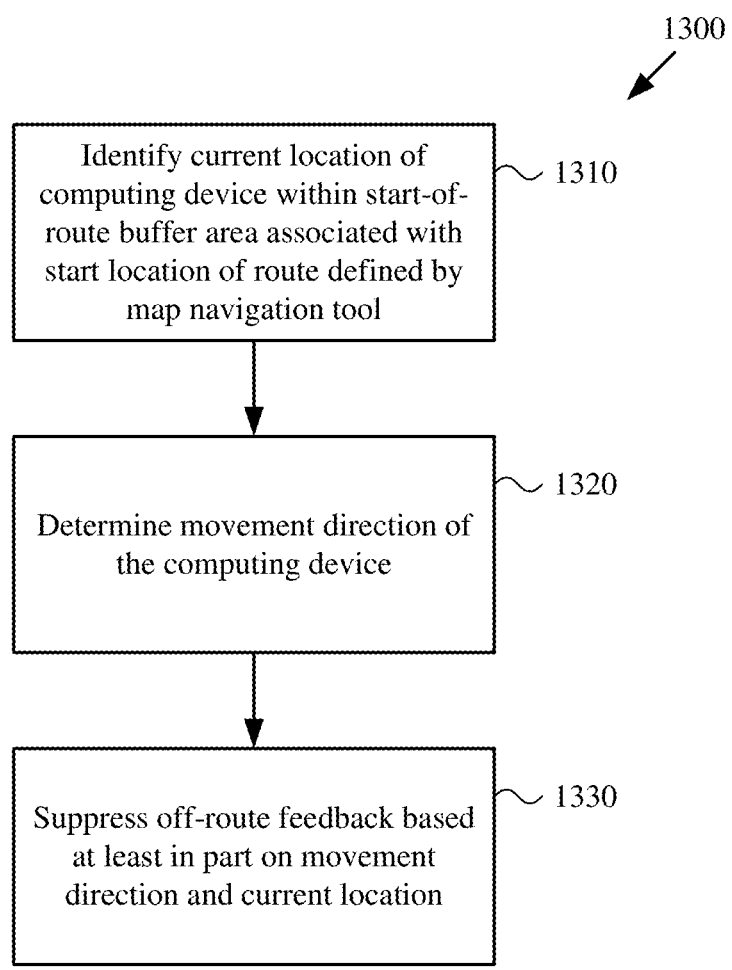

FIG. 13 shows another technique (1300) for performing map navigation using a start-of-route buffer area associated with a route defined by a map navigation tool. A computing device such as a mobile computing device can perform the technique (1300). For example, a mobile computing device identifies (1310) a current location of the mobile computing device, the current location being within a start-of-route buffer area associated with a start location of the route. The mobile computing device determines (1320) a movement direction of the mobile computing device. For example, the mobile computing device can compare the current location with a previous location of the mobile computing device to determine movement direction. The mobile computing device suppresses (1330) off-route feedback based at least in part on the movement direction and the current location. For example, in one implementation, if the movement direction is such that a distance between the current location and the start location is not increasing, off-route feedback is suppressed, and if the movement direction is such that a distance between the current location and the start location is increasing, off-route feedback is not suppressed. The mobile computing device can determine a rate of movement between the current location and the start location, and can selectively raise an off-route event based at least in part on the movement direction and the rate of movement. In one implementation, if the movement direction indicates movement away from the start location and the rate of movement is less than a threshold, an off-route event is raised. The technique (1300) can be used in situations such as where the computing device being tracked is located within the start-of-route buffer when the route is generated.

Figure 14:
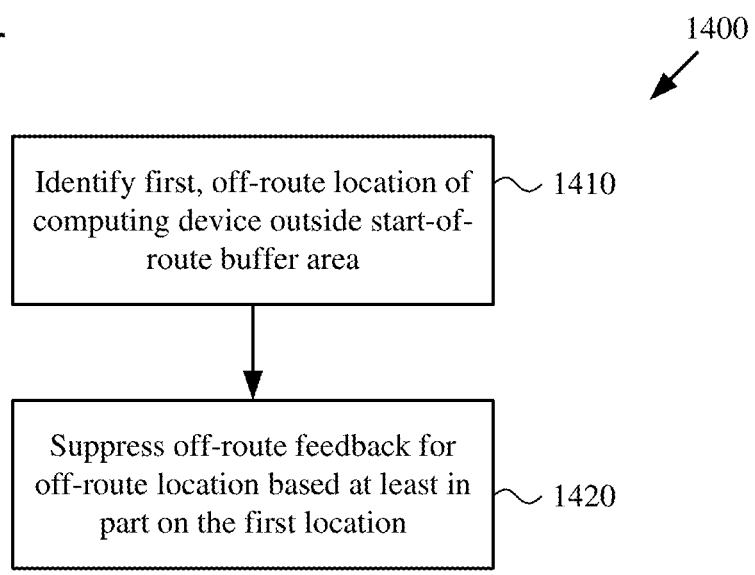
FIG. 14 is a flowchart showing a generalized technique for performing map navigation in which off-route feedback is suppressed for a computing device located outside a start-of-route buffer area.

FIG. 14 shows a generalized technique (1400) for performing map navigation in which off-route feedback is suppressed for a computing device located outside a start-of-route buffer area. A computing device such as a mobile computing device can perform the technique (1400). For example, a mobile computing device identifies (1410) a first, off-route location of the mobile computing device outside a start-of-route buffer area, and suppresses (1420) off-route feedback based at least in part on the first location. The technique (1400) can be used in situations such as where the computing device being tracked is located at an off-route location outside the start-of-route buffer area when the route is generated. The off-route feedback can remain suppressed during movement of the computing device to a second location (e.g., an on-route location).

Figure 15:
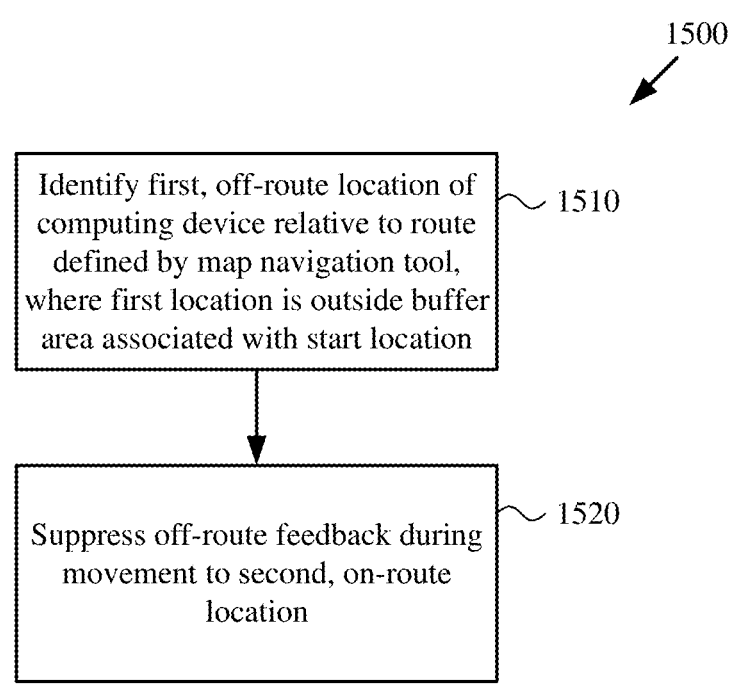
FIG. 15 is a flowchart showing a generalized technique for performing map navigation in which off-route feedback is suppressed during movement from an off-route location to an on-route location

FIG. 15 shows a generalized technique (1500) for performing map navigation in which off-route feedback is suppressed during movement from an off-route location to an on-route location. A computing device such as a mobile computing device can perform the technique (1500). For example, a mobile computing device identifies (1510) a first, off-route location of the mobile computing device, where the first location is outside a buffer area associated with a start location of the route. The mobile computing device suppresses (1520) off-route feedback during movement of the mobile computing device being tracked to a second, on-route location. Different functionality (e.g., idle timer reset functionality, dynamic zoom functionality, map view orientation, tap input functionality) can be changed in the map navigation tool for the second location relative to the first location. FIG. 16 shows a detailed technique (1600) for performing map navigation in which off-route feedback is suppressed during movement from an off-route location to an on-route location. For example, a mobile computing device identifies (1610) a first, off-route location of the mobile computing device relative to a route defined by a map navigation tool, where the first location is outside a buffer area associated with start location. The mobile computing device suppresses (1620) off-route feedback during movement to a second, on-route location. For the second location of computing device (relative to the first location), the mobile computing device changes (1630) idle timer reset functionality of the mobile computing device, changes (1640) dynamic zoom functionality of the map navigation tool, changes (1650) orientation of a map view in the map navigation tool, and changes (1660) tap input functionality of the map navigation tool. The techniques (1500, 1600) can be used in situations such as where the computing device being tracked is located at an off-route location outside a start-of-route buffer area when the route is generated, and then moves to join the route (e.g., at a location downstream from the start location).

Although acts described herein (e.g., acts shown in FIGS. 6-10 and 12-16) can be performed by a single client computing device, in any of the described examples a server computing device also can perform one or more of the illustrated acts, and can service requests from multiple client computing devices. Server processing can be stateless, or a server computing device can remember state information for specific client computing devices from request to request.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method performed on a mobile computing device implementing a map navigation tool, the method comprising:
   determining a route between a start location and an end location;
   identifying, using a processor within the map navigation tool, an off-route location of the mobile computing device which is outside of a start-of-route buffer area encircling the start location;
   suppressing feedback from the map navigation tool for the off-route location;
   detecting that the mobile computing device moves from the off-route location; and
   suppressing feedback from the map navigation tool as the mobile computing device moves from the off-route location to an on-route location.

2. The computer-implemented method of claim 1, further including calculating the start-of-route buffer area as a circular area with a fixed radius around the start location and wherein the off-route location is a current location of the mobile computing device outside of the circular area.

3. The computer-implemented method of claim 1, further including changing an idle timer reset functionality of the mobile computing device when the mobile computing device moves from the off-route location to the on-route location, wherein the idle timer controls a screen lock of the map navigation tool.

4. The computer-implemented method of claim 1, further including changing orientation of a map view in the map navigation tool in response to detecting that the mobile computing device is at the on-route location.

5. The computer-implemented method of claim 1, further including detecting a direction of movement of the mobile computing device from the off-route location towards the on-route location and turning off the suppressing of the feedback of the map navigation tool.

6. The computer-implemented method of claim 1, wherein the map navigation tool is configured to determine a rate of movement of the mobile computing device.

7. The computer-implemented method of claim 1, further including detecting that the mobile computing device has moved on-route downstream of the start-of-route buffer area and turning off of the suppressing of the feedback so that map navigation is displayed on the mobile computing device.

8. The computer-implemented method of claim 1, further including selectively suppressing feedback based on whether a current location of the mobile computing device is within a terminus buffer area.

9. At least one non-volatile computer memory storing instructions for performing a method of navigating, comprising:
   identifying a route between a start location and an end location for a map navigation tool;
   receiving location information for a mobile computing device;
   calculating a start-of-route buffer area encircling the start location;
   determining that the mobile computing device has a current location outside of the start-of-route buffer area; and
   suppressing feedback from the map navigation tool while the mobile computing device is outside of the start-of-route buffer area;
   wherein a size of the start-of-route buffer area is variable based at least in part on the current location of the mobile computing device.

10. The at least one non-volatile computer memory of claim 9, further comprising:
    selectively suppressing the feedback based on a direction that the mobile computing device is moving.

11. The at least one non-volatile computer memory of claim 10, wherein the selectively suppressing includes:
    if the movement direction is such that a distance between the mobile computing device and the start location is decreasing, then the feedback is suppressed;

if the movement direction is such that the distance is increasing, then the feedback is output from the mobile computing device.

12. The at least one non-volatile computer memory of claim 9, wherein the feedback remains suppressed during movement of the mobile computing device to a second location, the second location being an on-route location.

13. The at least one non-volatile computer of claim 9, wherein an idle timer reset functionality for the mobile computing device is changed when the mobile computing device is moved to an on-route location.

14. A mobile computing device, comprising:
a processor;
a map navigation tool configured by the processor to perform the following:
identify a route between a start location and an end location;
receive location information for the mobile computing device;
calculate a start-of-route buffer area around the start location;
determine that the mobile computing device is outside of the start-of-route buffer area;
suppress feedback from the map navigation tool while the mobile computing device is outside of the start-of-route buffer area;
wherein the mobile computing device is a smart phone with a touch screen, and wherein a size of the start-of-route buffer area is variable based at least in part on a current location.

15. The mobile computing device of claim 14, wherein the start-of-route buffer area is circular.

16. The mobile computing device of claim 14, wherein the map navigation tool is configured to selectively suppress the feedback without user input.

17. The mobile computing device of claim 14, wherein the map navigation tool provides a list of directions between the start location and the end location.

18. A computer-implemented method performed on a mobile computing device implementing a map navigation tool, the method comprising:
determining a route between a start location and an end location;
identifying, using a processor within the map navigation tool, an off-route location of the mobile computing device which is outside of a start-of-route buffer area encircling the start location;
suppressing feedback from the map navigation tool for the off-route location; and
further including detecting that the mobile computing device has moved on-route downstream of the start-of-route buffer area and turning off of the suppressing of the feedback so that map navigation is displayed on the mobile computing device.

19. The computer-implemented method of claim 18, further including detecting a direction of movement of the mobile computing device from the off-route location towards an on-route location and turning off the suppressing of the feedback of the map navigation tool.

20. A computer-implemented method performed on a mobile computing device implementing a map navigation tool, the method comprising:
determining a route between a start location and an end location;
identifying, using a processor within the map navigation tool, an off-route location of the mobile computing device which is outside of a start-of-route buffer area encircling the start location;
suppressing feedback from the map navigation tool for the off-route location; and
selectively suppressing feedback based on whether a current location of the mobile computing device is within a terminus buffer area.

21. The computer-implemented method of claim 20, further including detecting a direction of movement of the mobile computing device from the off-route location towards an on-route location and turning off the suppressing of the feedback for the off-route location.

22. The computer-implemented method of claim 20, wherein a size of a start-of-route buffer area is variable based at least in part on a current location of the mobile computing device.

23. At least one non-volatile computer memory storing instructions for performing a method of navigating, comprising:
identifying a route between a start location and an end location for a map navigation tool;
receiving location information for a mobile computing device;
calculating a start-of-route buffer area encircling the start location;
determining that the mobile computing device has a current location outside of the start-of-route buffer area;
suppressing feedback from the map navigation tool while the mobile computing device is outside of the start-of-route buffer area; and
wherein the feedback remains suppressed during movement of the mobile computing device to an on-route location.

24. The at least one non-volatile computer memory of claim 23, further including:
selectively suppressing the feedback based on a direction that the mobile computing device is moving;
wherein the selectively suppressing includes:
if the movement direction is such that a distance between the mobile computing device and the start location is decreasing, then the feedback is suppressed;
if the movement direction is such that the distance is increasing, then the feedback is output from the mobile computing device.

* * * * *